US012463549B2

(12) United States Patent
Everts et al.

(10) Patent No.: US 12,463,549 B2
(45) Date of Patent: Nov. 4, 2025

(54) ELECTRICAL POWER CONVERTER

(71) Applicant: PRODRIVE TECHNOLOGIES INNOVATION SERVICES B.V., Son en Breugel (NL)

(72) Inventors: Jordi Everts, Son en Breugel (NL); Noud Slaats, Son en Breugel (NL)

(73) Assignee: PRODRIVE TECHNOLOGIES INNOVATION SERVICES B.V., Son en Breugel (NL)

( * ) Notice: Subject to any disclaimer, the term of this patent is extended or adjusted under 35 U.S.C. 154(b) by 415 days.

(21) Appl. No.: 17/997,793

(22) PCT Filed: May 3, 2021

(86) PCT No.: PCT/EP2021/061598
§ 371 (c)(1),
(2) Date: Nov. 2, 2022

(87) PCT Pub. No.: WO2021/224194
PCT Pub. Date: Nov. 11, 2021

(65) Prior Publication Data
US 2023/0223860 A1 Jul. 13, 2023

(30) Foreign Application Priority Data
May 4, 2020 (NL) .................................... 2025505

(51) Int. Cl.
*H02M 7/219* (2006.01)
*H02J 7/02* (2016.01)
(Continued)

(52) U.S. Cl.
CPC ............... *H02M 7/219* (2013.01); *H02J 7/02* (2013.01); *H02M 1/0067* (2021.05);
(Continued)

(58) Field of Classification Search
CPC ...... H02M 7/219; H02M 7/2195; H02M 7/23; H02M 7/217; H02M 7/155; H02M 7/1555;
(Continued)

(56) References Cited

U.S. PATENT DOCUMENTS 5,784,269 A * 7/1998 Jacobs .................. H02M 3/158
363/89
2013/0286689 A1 10/2013 Videt
(Continued)

FOREIGN PATENT DOCUMENTS

JP 2013546299 A 12/2013
WO WO-2020035527 A1 * 2/2020 .............. B60L 53/12

OTHER PUBLICATIONS

International Search Report and Written Opinion of the International Searching Authority from the European Patent Office, in PCT/EP2021/061598 dated Aug. 9, 2021, which is an international application corresponding to this U.S. application.

*Primary Examiner* — Alexander H Taningco
(74) *Attorney, Agent, or Firm* — Kolitch Romano Dascenzo Gates LLC

(57) ABSTRACT

An AC-DC converter includes three phase terminals, first and second DC terminals, a first converter stage for converting between the AC signal and a first signal at first and second intermediate nodes, a second converter stage to convert between a second signal at third and fourth intermediate nodes and the DC signal at the first and second DC terminals. The second converter stage has a first active switch. A link connects the first and third intermediate nodes and the second and fourth intermediate nodes. A current injection circuit has second active switches. In a first mode, the first active switch and the second active switches are operated through PWM. In a second mode, the third and fourth intermediate nodes are continuously connected to the (Continued)

first and second DC terminals such that the second converter stage is inoperative and the second active switches are operated through PWM.

19 Claims, 17 Drawing Sheets

(51) Int. Cl.
  *H02M 1/00* (2006.01)
  *H02M 1/42* (2007.01)
  *H02M 3/156* (2006.01)
  *B60L 53/20* (2019.01)

(52) U.S. Cl.
  CPC ....... *H02M 1/4225* (2013.01); *H02M 1/4233* (2013.01); *H02M 3/156* (2013.01); *B60L 53/20* (2019.02)

(58) Field of Classification Search
  CPC ............. H02M 7/1557; H02M 7/1623; H02M 7/1626; H02M 7/17; H02M 7/7575; H02M 7/21; H02M 7/95
  See application file for complete search history.

(56) References Cited

U.S. PATENT DOCUMENTS

| | | | |
|---|---|---|---|
| 2015/0069953 A1* | 3/2015 | Seong | B60L 58/30 320/162 |
| 2016/0149507 A1 | 5/2016 | Lei et al. | |
| 2017/0373585 A1 | 12/2017 | Anwar et al. | |
| 2018/0254732 A1* | 9/2018 | Smolenaers | H02J 1/12 |
| 2021/0146782 A1 | 5/2021 | Lehn et al. | |
| 2021/0359595 A1* | 11/2021 | Everts | H02M 7/219 |
| 2021/0399629 A1* | 12/2021 | Everts | H02M 1/4283 |
| 2023/0179116 A1* | 6/2023 | Everts | H02M 1/32 363/127 |

\* cited by examiner

ELECTRICAL POWER CONVERTER

TECHNICAL FIELD

The present disclosure relates to the field of electrical power conversion. In particular, the present disclosure relates to an electrical converter and a method for operating the electrical converter.

INTRODUCTION

When the battery of an electric vehicle is charged, the AC voltage from an electrical grid is converted by an electrical converter into a DC voltage which is then provided to the battery that is being charged. For example, an electrical converter may convert a three-phase AC voltage into a DC voltage between the terminals of a DC bus to which the high-voltage (e.g. 800 V) battery of the vehicle may be connected. Also wireless charging systems for electric cars, or gradient amplifiers for Magnetic Resonance Imaging (MRI) scanners typically need such three-phase AC-to-DC conversion to create a high-voltage DC bus from which power can be drawn.

Usually the current that is drawn by the electrical converter from each phase of the three-phase grid, for example when a load draws power from the DC output of the electrical converter, needs to be substantially sinusoidal and substantially in phase with the sinusoidal voltage of that particular phase, resulting in a power factor that is substantially equal to one. Therefore, the three-phase AC-to-DC conversion advantageously requires a three-phase Power Factor Correcting (PFC) electrical AC-to-DC converter. Also low distortion, for example a low Total Harmonic Distortion (THD), of the grid current is typically required for such PFC converters.

Typically, when the voltage between the DC bus terminals is higher than the full-wave rectified AC voltage, boost-type electrical converters are used, comprising a boost-type PFC stage with a 700-800 V DC output.

The output of the boost-type PFC converter is typically delivered to a series-connected galvanically isolated DC/DC converter stage, which generates the final output voltage and/or battery charging current. The operation and control of both converter stages is often decoupled allowing the two stages to be commissioned separately. However, when the required output voltage is low, which may be the case when the battery is largely depleted, the isolated DC/DC converter stage must fully absorb a high voltage ratio, which places stress on, and requires over-dimensioning of the converter components, reducing service life and increasing cost.

SUMMARY

It is an objective of the present disclosure to provide a converter system of the above type, and in particular to provide an electrical converter for three-phase boost-type PFC AC-to-DC conversion that allows to overcome the above disadvantages.

According to a first aspect of the present disclosure, there is therefore provided an electrical converter.

An electrical converter according to the present disclosure allows for converting an AC signal having three phase voltages to a DC signal, preferably a DC voltage. The electrical converter comprises three phase terminals, a first DC terminal and a second DC terminal, a first converter stage, a second converter stage, a current injection circuit and a control unit. The electrical converter optionally comprises a neutral terminal for connecting the neutral conductor of the grid. The first converter stage is operably coupled to the three phase terminals and comprises a first intermediate node and a second intermediate node. The first converter stage is configured for converting between the AC signal at the three phase terminals and a first signal at the first intermediate node and the second intermediate node. The first signal can be a (switched) voltage or a current. The second converter stage is operably coupled to the first and second DC terminals and comprises a third intermediate node and a fourth intermediate node. The second converter stage comprises at least one first active switch and is operable to convert between a second signal, e.g. a (switched) voltage or a current, at the third and fourth intermediate nodes and the DC signal at the first and second DC terminals.

A link connects the first intermediate node to the third intermediate node and the second intermediate node to the fourth intermediate node. The link can be a DC-link and can comprise electrical energy storage elements, such as capacitors and/or inductors, or it can alternatively be free of electrical energy storage elements.

The current injection circuit is operable to connect between the phase terminal having a smallest absolute instantaneous voltage value of the three phase voltages and the first and second DC terminals, or between the phase terminal having a smallest absolute instantaneous voltage value and the first and second intermediate node through second active switches.

The control unit (or controller) is implemented with a first mode of operation in which the at least one first active switch and the second active switches are operated through pulse width modulation. The second converter stage comprises, or consists of, a boost circuit, allowing the electrical converter to obtain in the first mode of operation a DC voltage at the first and second DC terminals which is higher than an instantaneous full-wave rectified voltage of the phase voltages of the AC signal. This can be obtained by operation of the first active switch(es) and possibly the second active switches (of the current injection circuit) by pulse width modulation (via the control unit).

According to the present disclosure, the control unit is implemented with a second mode of operation in which the second active switches are operated through pulse width modulation (via the control unit), while the second converter stage, e.g. the boost circuit, is inoperative, in particular, the third and fourth intermediate nodes are continuously connected to the first and second DC terminals respectively. By so doing, a DC voltage at the first and second DC terminals can be obtained which is equal to an instantaneous full-wave rectified voltage of the phase voltages of the AC signal.

One advantage of the present disclosure, is that the second mode of operation allows to reduce the average DC bus voltage when a low voltage is required by the load. This reduces stress on any converter stage connected at the DC terminals. Another advantage, is that by continuing operating the current injection circuit during the second mode of operation, a sinusoidal current and unity power factor can be obtained at the AC side while the DC signal is a pulsating voltage (and current). This is particularly true when a third converter stage is connected to the first and second DC terminals, such as a (galvanically isolated) DC/DC converter or a DC/AC converter which is advantageously operated in constant power mode.

The current injection circuit can be implemented in various ways. One implementation involves a phase selector comprising third active switches configured for selectively connecting the three phase terminals to a fifth intermediate node, and the second active switches are operable to connect the fifth intermediate node to the first DC terminal and to the second DC terminal. The control unit is configured to control switching of the third active switches according to a switching pattern in which the phase terminal having a smallest absolute instantaneous voltage value is continuously connected to the fifth intermediate node. An alternative implementation integrates the current injection circuit in an active bridge converter of the first converter stage. By active (pulse width modulation) control of the active switches of the active bridge converter, the phase terminal having a smallest absolute instantaneous voltage value can be connected to the first and second intermediate nodes.

The electrical converter according to the present disclosure can comprise one or more voltage measuring sensors, for measuring the phase voltages of the AC signal and/or the voltage at the first and second DC terminals and/or the voltage at the first and second intermediate nodes. The controller can be operably coupled to the voltage measuring sensor(s) and can comprise a first input for receiving a third signal representative of a set or a measured voltage at the first and second DC terminals. The controller can be configured to determine a threshold representative of an instantaneous full-wave rectified voltage value of the AC signal and to automatically switch operation to the second mode of operation based on comparison between the third signal and the threshold, e.g. when a (voltage) value of the third signal is equal to or lower than the threshold.

According to a second aspect of the present disclosure, there is provided a battery charging system, an electric motor drive system, or a magnetic resonance imaging apparatus comprising a power supply unit, the power supply unit comprising the electrical converter of the first aspect.

According to a third aspect, a method of converting a three phase AC input into a DC output is described herein. The method is advantageously implemented in the electrical converter as set out above.

An aspect of the present disclosure relates to an electrical converter, that, for example may be used for converting a three-phase AC voltage from an electrical grid, which may be a low voltage (e.g. 380-400 Vrms at 50 Hz frequency) grid, into a high DC output voltage (e.g. 800 V).

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
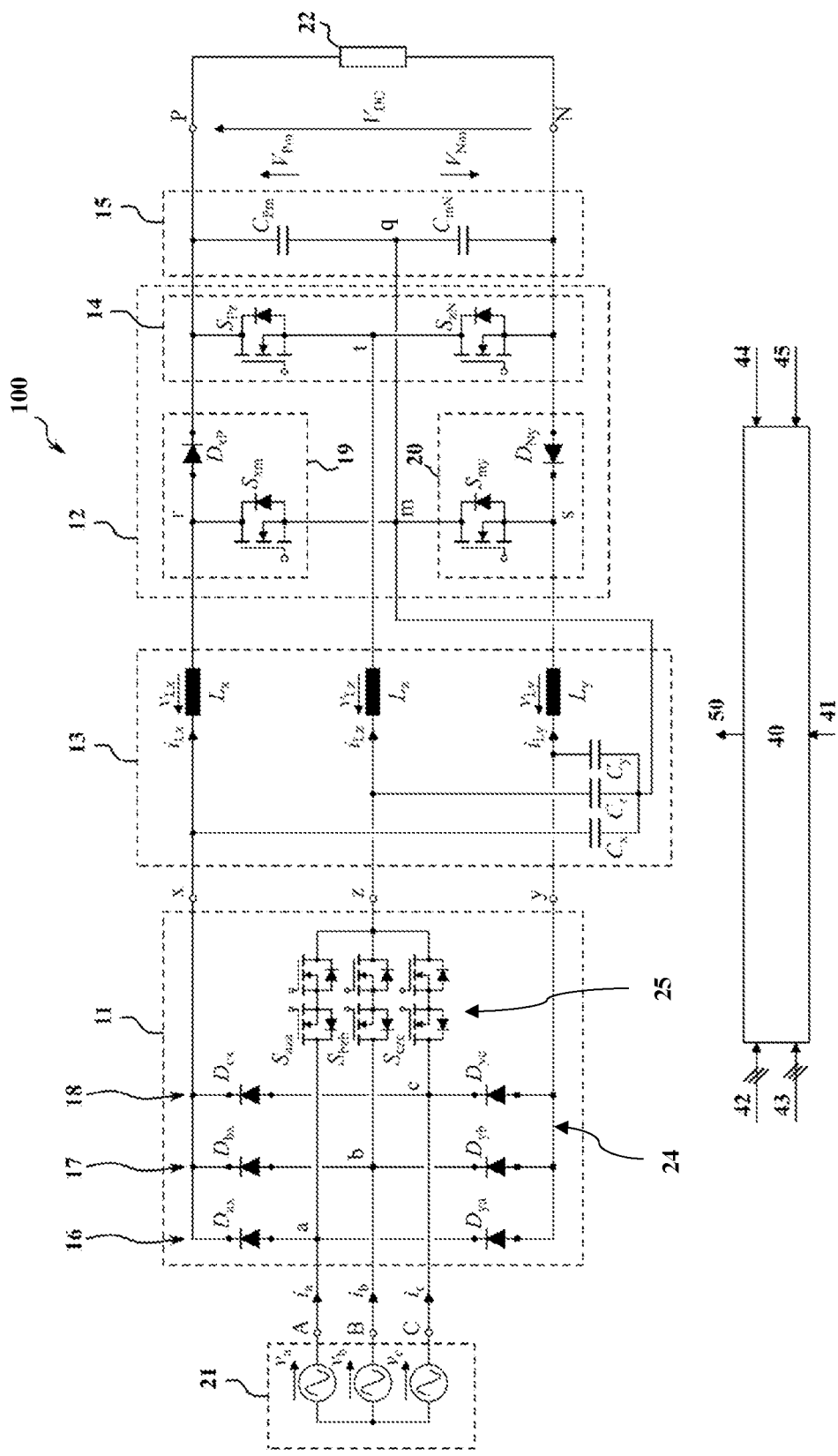
FIG. 1 schematically shows an electrical converter that is unidirectional according to an embodiment of the present disclosure.

FIG. 1 shows an electrical converter 100, referred to as the DUTCH RECTIFIER, comprising two converter stages 11, 12 in the form of a three-phase active phase selector 11 and a DC/DC stage 12. Electrical converter 100 further comprises an input filter 13, and an output filter 15.

The electrical converter 100 is an AC-to-DC converter that has three phase inputs A, B, C which are connected to a three-phase voltage of a three-phase AC grid 21, and two DC outputs P, N which for example may be connected to a DC load 22 such as, for example, a high voltage (e.g. 800 V) battery of an electric car.

The first converter stage 11 comprises three phase connections a, b, c that are connected to the three phase inputs A, B, C, and three outputs x, y, z. These outputs may be seen as an upper intermediate voltage node x, a lower intermediate voltage node y, and a middle intermediate voltage node z.

The first converter stage 11 comprises a three-phase bridge rectifier 24 consisting of three bridge legs 16, 17, 18 which each comprise two passive semiconductor devices (diodes $D_{ax}$ and $D_{ya}$, for leg 16, $D_{bx}$ and $D_{yb}$ for leg 17, $D_{cx}$ and $D_{yc}$ for leg 18) connected in the form of a half bridge configuration, and a phase selector 25 comprising three selector switches ($S_{aza}$, $S_{bzb}$, and $S_{czc}$) which each comprise two anti-series connected actively switchable semiconductor devices. Each such switchable semiconductor device advantageously has an anti-parallel diode. In this example, Metal Oxide Field Effect Transistors (MOSFETs) are used for the actively switchable semiconductor devices, and each includes an internal anti-parallel body diode that may replace an external anti-parallel diode.

The DC/DC stage 12 comprises, or consists of, two stacked boost bridge legs 19, 20 and one buck-boost bridge leg 14. Each boost bridge leg (19, 20) comprises a boost switch ($S_{xm}$ for the upper boost bridge leg 19 and $S_{my}$ for the lower boost bridge leg 20) and boost diode ($D_{xP}$ for the upper boost bridge leg 19 and $D_{Ny}$ for the lower boost bridge leg 20) connected in a half-bridge configuration. The buck-boost bridge leg 14 comprises two buck-boost switches ($S_{Pz}$, and $S_{zN}$) connected in a half-bridge configuration. The middle node r of the upper boost bridge leg 19 is connected to intermediate voltage node x via an upper boost inductor $L_x$, the middle node s of the lower boost bridge leg 20 is connected to intermediate voltage node y via a lower boost inductor $L_y$, and the middle node t of the buck-boost bridge leg 14 is connected to intermediate voltage node z via a middle buck-boost inductor L.

The common node m of the upper and lower boost bridge legs 19, 20 is advantageously connected to the middle voltage node q of the output filter 15 to form two stacked two-level boost circuits. The output filter 15 comprises two output filter capacitors $C_{Pm}$, $C_{mN}$ that are connected in series between the upper output node P and the lower output node N and middle voltage node q forming the middle node between capacitors $C_{Pm}$ and $C_{mN}$.

The upper boost bridge leg 19 is connected between the upper output node P and the common node m (i.e. in parallel with the upper output filter capacitor $C_{Pm}$), and is arranged in a way that current can flow from the intermediate voltage node x to the upper output node P via the diode $D_{xP}$ when the switch $S_{xm}$ is open (not conducting, off state), and current can flow from the intermediate voltage node x to the common node m (or vice versa) via the switch $S_{xm}$ when the switch $S_{xm}$ is closed (conducting, on state). The boost switch ($S_{xm}$) of the boost bridge leg 19 is an actively switchable semiconductor device, for example a MOSFET.

The lower boost bridge leg 20 is connected between the common node m and the lower output node N (i.e. in parallel with the lower output filter capacitor $C_{mN}$), and is arranged in a way that current can flow from the lower output node N to the intermediate voltage node y via the diode $D_{Ny}$ when the switch $S_{my}$ is open (not conducting, off state), and current can flow from the common node m to the intermediate voltage node y (or vice versa) via the switch $S_{my}$ when the switch $S_{my}$ is closed (conducting, on state). The boost switch ($S_{my}$) of the boost bridge leg 20 is an actively switchable semiconductor device, for example a MOSFET.

The buck-boost bridge leg 14 is connected between the upper output node P and the lower output node N (i.e. in parallel with the DC load 22) and acts as a current injection circuit arranged such that current flows from the intermediate voltage node z to the upper output node P (or vice versa) when the switch $S_{Pz}$ is closed (conducting, on state) while the switch $S_{zN}$ is open (not conducting, off state), and current flows from the intermediate voltage node z to the lower output node N (or vice versa) when the switch $S_{zN}$ is closed (conducting, on state) while the switch $S_{Pz}$ is open (not conducting, off state). The buck-boost switches ($S_{Pz}$, $S_{zN}$) of the buck-boost bridge leg 14 are actively switchable semiconductor devices, e.g. MOSFETs, which are controlled in a complementary way (i.e. the one is closed while the other is open and vice versa).

Advantageously, three high-frequency (HF) filter capacitors $C_x$, $C_y$, $C_z$, which are part of the input filter 13, are interconnecting the intermediate voltage nodes x, y, z in the form of a star-connection. Generally, it is advantageous that the three capacitors $C_x$, $C_y$, $C_z$ have substantially equal value in order to symmetrically load the AC grid.

According to an aspect of the present disclosure, the controller is configured to operate according to a first mode of operation, referred to as normal operation, and to a second mode of operation, referred to as democratic operation as will be further described herein.

The central control unit 40 advantageously controls all the controllable semiconductor devices (switches) of the electrical converter 100, sending control signals to each switch via a communication interface 50. In particular, semiconductor devices $S_{aza}$, $S_{bzb}$, $S_{czc}$, $S_{xm}$, $S_{my}$, $S_{Pz}$, $S_{zN}$ are controlled by controller 40. Furthermore, the control unit has measurement input ports (42, 43, 44, 45), for receiving measurements of:
- 42: the AC-grid phase voltages $v_a$, $v_b$, $v_c$;
- 43: the inductor currents $i_{Lx}$, $i_{Ly}$, $i_{Lz}$;
- 44: the DC bus voltage $V_{DC}$;
- 45: the DC bus mid-point voltage $V_{mN}=-V_{Nm}$, and an input port 41 to receive a set-value, which may be a requested DC output voltage $V^*_{PN}$. Controller operation allows particularly to accomplish the piece-wise sinusoidal shapes of inductor currents $i_{Lx}$, $i_{Ly}$, $i_{Lz}$ during normal operation.

Figure 5:
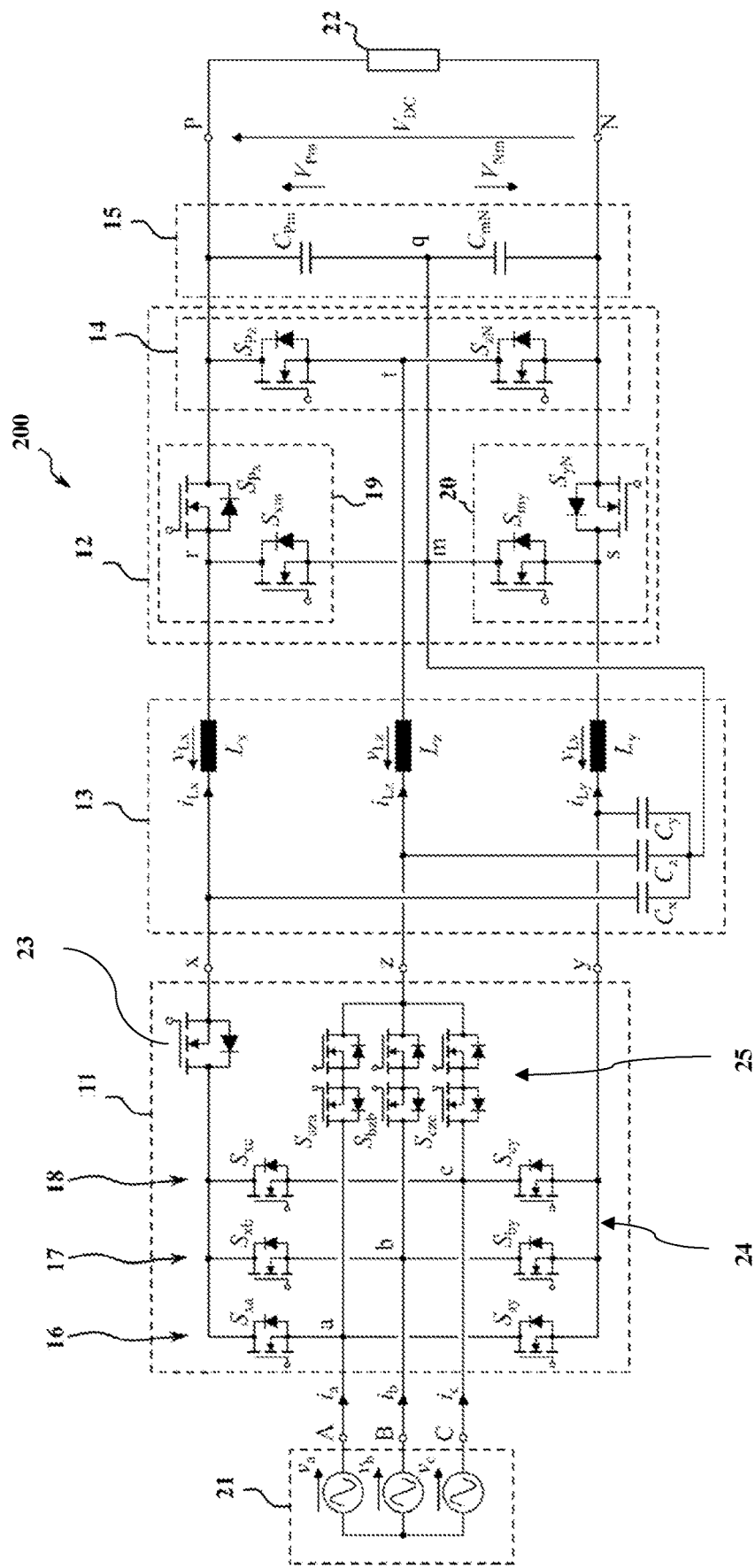
FIG. 5 schematically shows an electrical converter that is bidirectional according to an embodiment of the present disclosure.

The electrical converter 100 shown in FIG. 1 is unidirectional since the input stage 11 and the output power stage 12 contain diodes, only allowing power to be drawn from the electrical AC grid 21 and provide this power at the output to a load 22. FIG. 5, on the other hand, shows an electrical converter 200 according to the present disclosure that is bidirectional. Electrical converter 200 differs from converter 100 in that the diodes ($D_{ax}$, $D_{bx}$, $D_{cx}$, $D_{ya}$, $D_{yb}$, $D_{yc}$) of the input stage 11 and the diodes ($D_{xP}$, $D_{Ny}$) of the output power stage 12 of the converter shown in FIG. 1 have been replaced with controllable semiconductor switches ($S_{xa}$, $S_{xb}$, $S_{xc}$, $S_{ay}$, $S_{by}$, $S_{cy}$) in the input stage 11 and ($S_{yN}$, $S_{Px}$) in the output power stage 12 respectively.

The electrical converter 200 can comprise a switching device 23 connected between the upper node of bridge converter 24 and the upper intermediate node x. Switching device 23 allows to interrupt the electrical connection between the bridge rectifier 24 and the upper intermediate node x. The switching device 23 is provided as a semiconductor switch, e.g. MOSFET, but can alternatively be any suitable switching device, such as a relay switch. The switching device 23 is advantageously operably connected to controller 40. Alternatively, or in addition a same switching device as device 23 can be provided between the lower node of bridge converter 24 and the lower intermediate node y.

Figure 6:
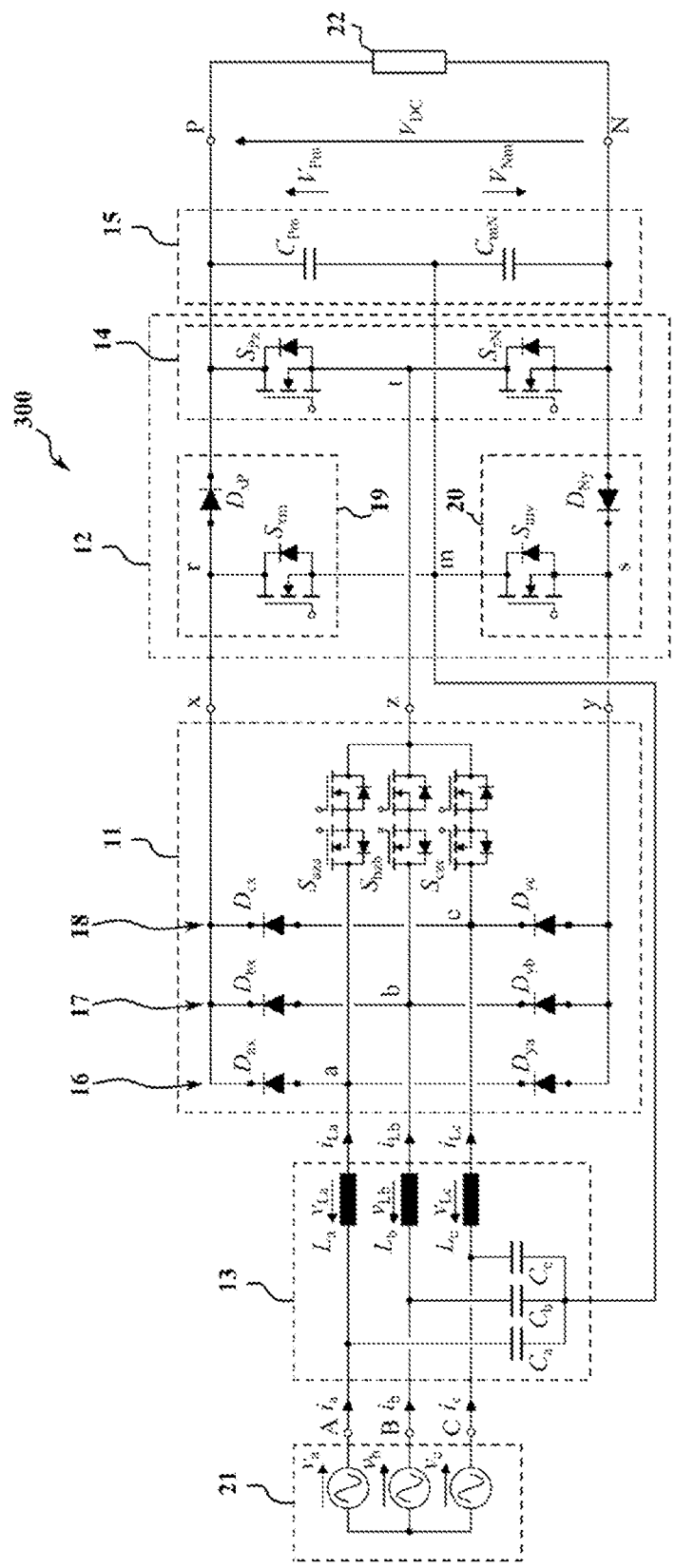
FIG. 6 schematically shows an electrical converter that is unidirectional, and that has an input filter that is placed before instead of after the first converter stage according to an embodiment of the present disclosure.

In FIG. 6, an electrical converter 300 is shown which differs from converter 100 in that the input filter 13 is placed before (instead of after) first converter stage 11, i.e. the input filter 13 is connected between the phase input terminals A, B, C and the first converter stage 11. The first converter stage 11 connects the phase input terminals A, B, C to the intermediate nodes x, y, z via the corresponding inductor $L_a$, $L_b$, $L_c$, of the input filter 13. Capacitors $C_a$, $C_b$, $C_c$ are arranged between the phase input terminals and the inductors. The capacitors are connected in a star configuration, advantageously with the star point connected to a midpoint of the output filter 15, just like in the previous examples. Alternatively, the capacitors $C_a$, $C_b$, $C_c$ can be arranged in a delta configuration across the three phase input lines. It will be convenient to note that in the example of FIG. 6, the voltage signal at the three intermediate nodes x, y, z is somewhat different as compared to the previous examples (FIG. 1, FIG. 5), since the voltages at switch nodes r, s and t are identical to the voltages at the intermediate nodes x, y, z. As a result, high frequency currents will be flowing through the first converter stage 11, whereas in the previous examples (FIG. 1 and FIG. 5) the high frequency currents only occur in the output power stage downstream of the input filter 13.

In either electrical converters 100, 200, and 300, diodes may be replaced by actively switchable semiconductor devices to allow for bidirectional power flow of the electrical converter.

In either electrical converters 100, 200 and 300, the HF capacitors $C_x$, $C_y$, $C_z$, (or $C_a$, $C_b$, $C_c$ in case of FIG. 6) are connected in a star configuration. The voltage in the star point connection can be controlled by controlling the voltage at the common node m.

Figure 7A:
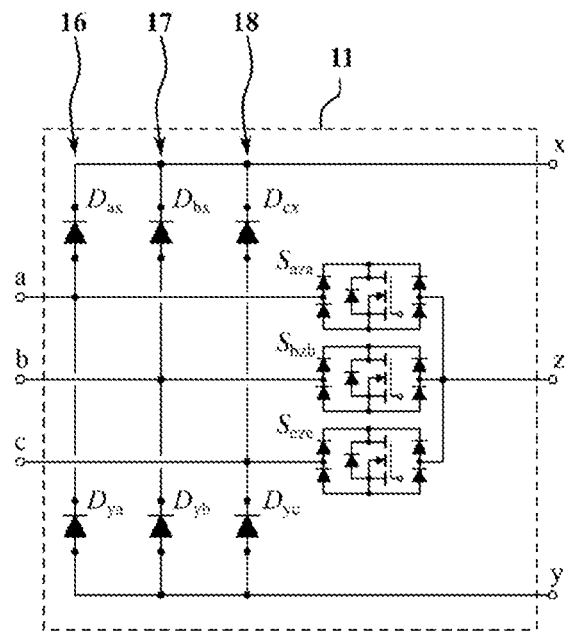
FIG. 7A, FIG. 7B show different variants of the first converter stage that can be used in electrical converters of the present disclosure.
Figure 7B:
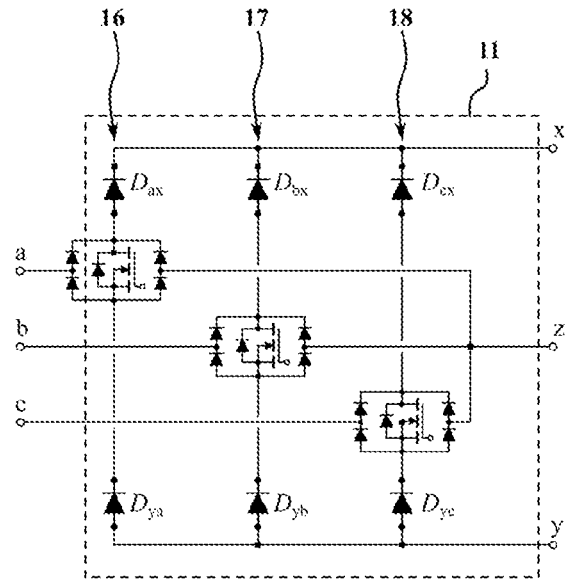

FIG. 7A, 7B show different variants of the first converter stage 11, which may be used in the electrical converters of either FIG. 1, FIG. 5, FIG. 6.

Figure 8A:
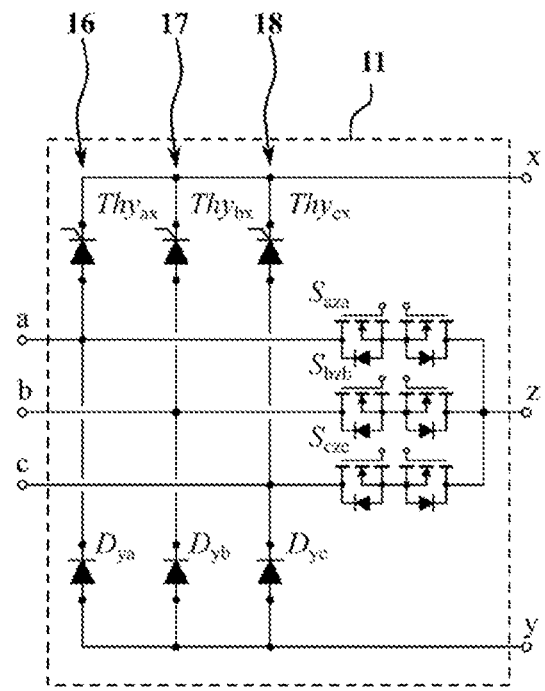
FIG. 8A and FIG. 8B show other variants of a first converter stage that can be used in electrical converters of the present disclosure.
Figure 8B:
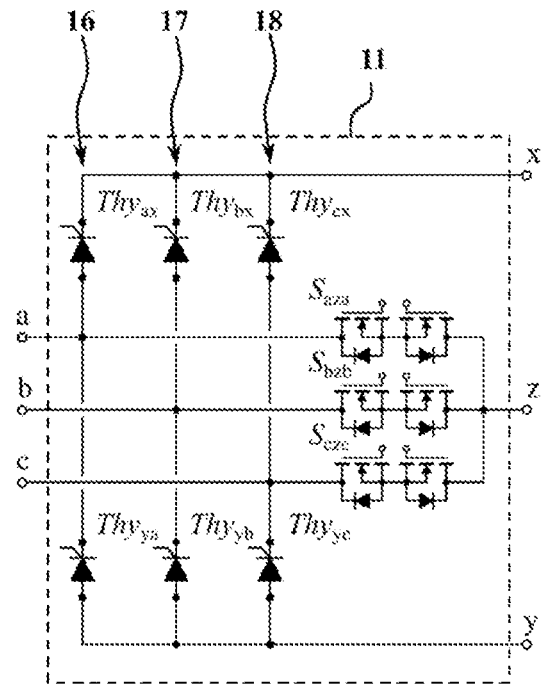

In FIGS. 8A-B yet other variants of the first converter circuit 11 are shown. In these variants, the three bridge legs 16, 17 and 18 of the phase selector are arranged as half-controlled thyristor legs (FIG. 8A), i.e. comprising thyristors $Thy_{ax}$, $Thy_{bx}$, $Thy_{cx}$, in the bridge leg portions connected to the upper intermediate node and diodes in the other bridge leg portion connected to the lower intermediate node (or vice versa), or as full-controlled thyristor legs (FIG. 8B), i.e. comprising a thyristor $Thy_{ax}$, $Thy_{bx}$, $Thy_{cx}$, $Thy_{ya}$, $Thy_{yb}$, $Thy_{yc}$, in each bridge half leg, instead of diodes. Such a phase selector allows for controllably pre-charging the output filter capacitors $C_{Pm}$, $C_{mN}$, or $C_{PN}$ without requiring an additional pre-charge circuit.

Figure 9:
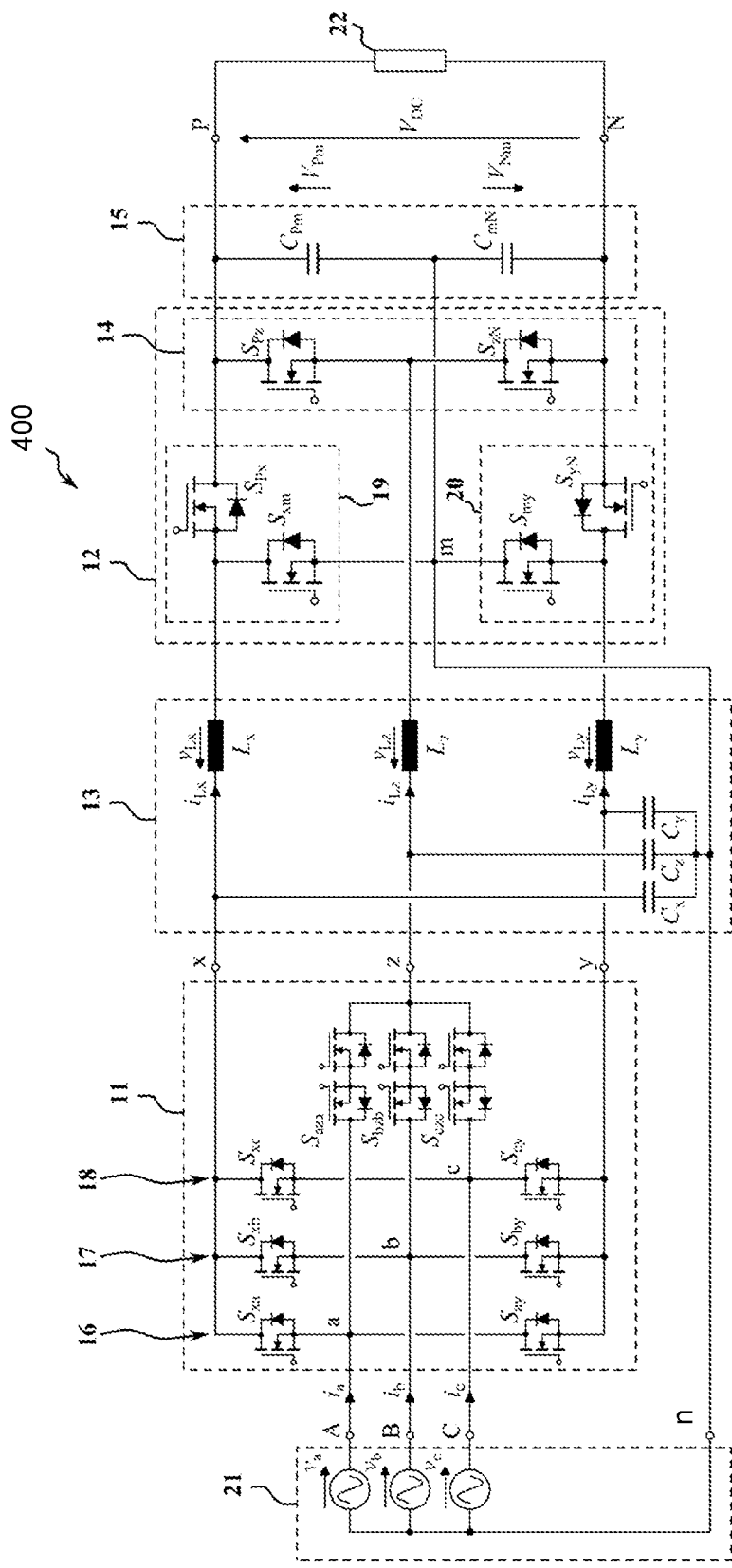
FIG. 9 represents an electrical converter according to aspects of the present disclosure that is unidirectional and comprises a connection terminal for connecting to the neutral conductor of the grid (fourth phase).

Referring to FIG. 9, the electrical converter 400 differs from the electrical converter 100, 200 or 300 in that it comprises a connection terminal n for connecting the neutral conductor of the three-phase AC grid. In some applications, such as for example the charging of electric vehicles, it is often required that the amplitude of the sinusoidal current drawn from each phase of the three-phase grid can be independently controlled in order to be able to decrease the loading of a certain phase such that other consumer devices are still able to draw power from that particular phase during the charging of the vehicle's battery while not overloading the phase. In this case, the connection terminal n is advantageously connected to the neutral conductor of the three-phase grid, allowing a return current substantially equal to the sum of the three phase currents to flow back to the neutral conductor of the grid. In an advantageous aspect, the three phase currents can be fully independently controlled by providing a common node connected to the neutral conductor of the input.

The neutral connection terminal n is advantageously connected to the star-point of the AC capacitors $C_x$, $C_y$, $C_z$ and to the common node m of the stacked boost bridges 19, 20 (and thus also to the midpoint of the output filter 15). This results in a fully symmetrical converter structure. In this case, the voltage at the star-point and at the common node is equal to the voltage of the neutral conductor of the grid.

Normal Operation of the Electrical Converter

During normal operation, the switching device 23, if present, is kept closed (conducting state) to apply the phase input having highest voltage by the bridge rectifier 24 to the upper intermediate node x.

Referring to FIG. 1 (or FIG. 5 wherein reference to the diodes $D_{ax}$, $D_{bx}$, $D_{cx}$, $D_{ya}$, $D_{yb}$, $D_{yc}$, and $D_{xP}$, $D_{Ny}$ should be read as reference to active switches $S_{xa}$, $S_{xb}$, $S_{xc}$, $S_{ay}$, $S_{by}$, $S_{cy}$, and $S_{Px}$, $S_{yN}$, respectively) the bridge leg of the bridge rectifier 24 that is connected with the phase input A, B, or C that has the highest voltage of the three-phase AC input voltage is switched in a way that the corresponding phase input A, B, or C is connected to the upper intermediate voltage node x. To achieve this, the bridge leg connects the corresponding phase connection a, b, or c with the node x via the upper diode ($D_{ax}$, $D_{bx}$, $D_{cx}$) of the bridge leg, while the corresponding selector switch ($S_{aza}$, $S_{bzb}$, $S_{czc}$) of the bridge leg is open (not conducting, off state). The bridge leg of the rectifier 24 that is connected with the phase input A, B, or C that has the lowest voltage of the three-phase AC input voltage is switched in a way that the corresponding phase input A, B, or C is connected to the lower intermediate voltage node y. To achieve this, the bridge leg connects the corresponding phase connection a, b, or c with the node y via the lower diode ($D_{ya}$, $D_{yb}$, $D_{yc}$) of the bridge leg, while the corresponding selector switch ($S_{aza}$, $S_{bzb}$, $S_{czc}$) of the bridge leg is open (not conducting, off state). The phase input A, B, or C that has a voltage between the highest voltage and the lowest voltage of the three-phase AC input voltage is connected by phase selector 25 to the middle intermediate voltage node z. To achieve this, the by phase selector 25 connects the corresponding phase connection a, b, or c with the node z via the selector switch ($S_{aza}$, $S_{bzb}$, $S_{czc}$) which is closed (conducting, on state).

Figure 2A:
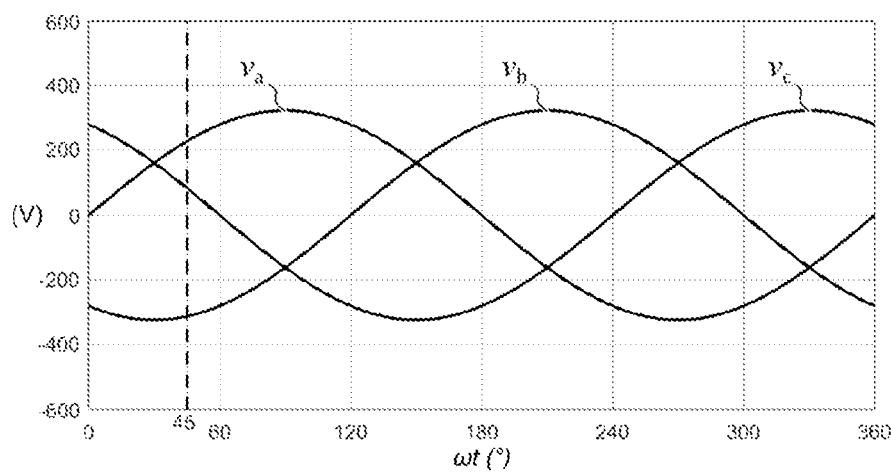
FIGS. 2A-G show diagrams with respectively voltages (FIG. 2A, 2B, 2C), currents (FIG. 2D, 2E) and switching states of the phase-selector switches (FIG. 2F) and switching states of the switches of the boost (upper and lower) and buck-boost circuits (FIG. 2G) during a 360° period of the AC mains voltage, and illustrates the overall operating principle of the electrical converter according to an embodiment of the present disclosure.
Figure 2B:
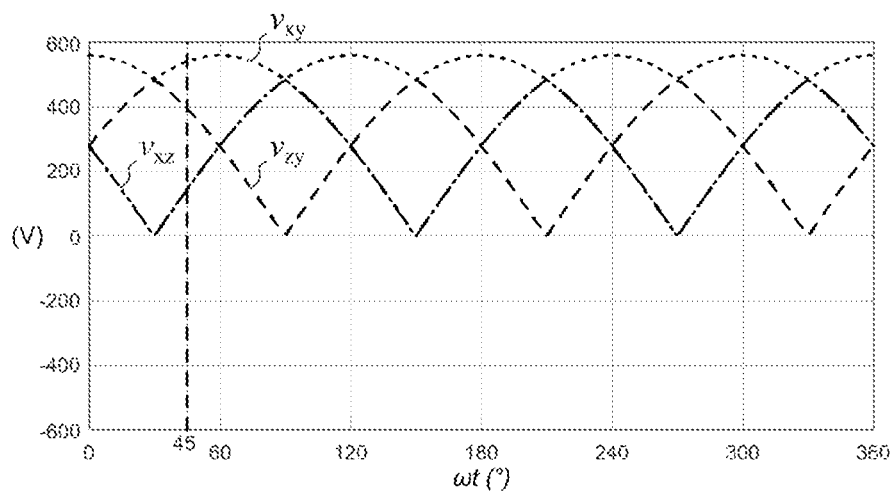
Figure 2C:
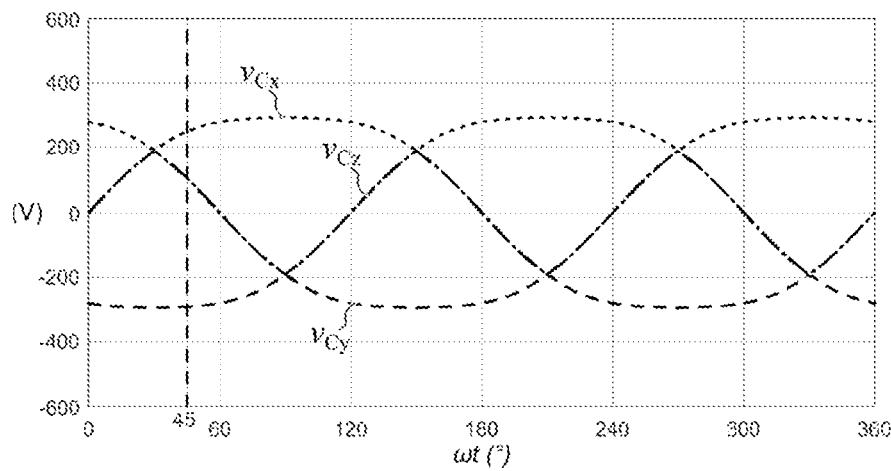

In a three-phase AC grid with substantially balanced phase voltages, for example as shown in FIG. 2A, the three-phase AC input voltage (shown in FIG. 2A) is converted into three intermediate DC voltages ($v_{xz}$, $v_{zy}$, $v_{xy}$; shown in FIG. 2B) provided between the upper intermediate voltage node x, the lower intermediate voltage node y and the middle intermediate voltage node z. These DC voltages thus show piece-wise sinusoidal shapes. The conversion of the three-phase AC input voltage into three intermediate DC voltages is the result of the operation of the first converter stage 11, as explained above. The switching states (switch on →S=1, switch off →S=0) of the selector switches ($S_{aza}$, $S_{bzb}$, $S_{czc}$) are shown in FIG. 2F. It can be seen that the switches are 'on' or 'off' continuously during whole particular 60° sectors within the period (360°) of the AC mains voltage. Also the diodes of the bridge rectifier 24 are 'conducting' or 'not conducting' during whole particular sectors, e.g. of 60°, within the period (360°) of the AC mains voltage. The combination of states of the switches and diodes is unique for every 60° sector of the three-phase AC input voltage and depends on the voltage value of the phase inputs (A, B, C). The sequence of the 6 unique states of the switches and diodes repeats itself every period (360°) of the AC mains voltage.

Seen from the viewpoint of the intermediate voltage nodes x, y, z towards the output terminals P, N, a conventional DC-DC boost circuit (upper boost circuit) is formed, comprising the HF filter capacitor $C_x$, the upper boost inductor $L_x$, the upper boost bridge leg 19, and the upper output capacitor $C_{Pm}$. The input voltage of this upper boost circuit is the voltage $v_{Cx}$ (shown in FIG. 2C) across capacitor $C_x$, and the output voltage of this upper boost circuit is the voltage $V_{Pm}$ across the upper output capacitor $C_{Pm}$, having a voltage value that is substantially equal to half the total DC bus voltage ($V_{Pm} \approx V_{DC}/2$). The formed upper boost circuit may be operated by PWM modulation of the switch $S_{xm}$ at a specified, possibly variable, switching frequency $f_s$ in order to control the current in the upper boost inductor $L_x$.

Seen from the viewpoint of the intermediate voltage nodes x, y, z towards the output terminals P, N, a conventional 'Inversed' (negative input voltage and negative output voltage) DC-DC boost circuit (lower boost circuit) is formed, comprising the HF filter capacitor $C_y$, the lower boost inductor $L_y$, the lower boost bridge leg 20, and the lower output capacitor $C_{mN}$. The input voltage of this lower boost circuit is the voltage $v_{Cy}$ (shown in FIG. 2C) across capacitor $C_y$ and the output voltage of this lower boost circuit is the voltage $V_{Nm}$ across the lower output capacitor $C_{mN}$, having a voltage value that is substantially equal to minus half the total DC bus voltage ($V_{Nm} \approx -V_{DC}/2$). The formed lower boost circuit may be operated by PWM modulation of the switch $S_{my}$ at a specified, possibly variable, switching frequency $f_s$ in order to control the current in the lower boost inductor $L_y$.

Seen from the viewpoint of the intermediate voltage nodes x, y, z towards the output terminals P, N, a conventional DC-DC buck-boost circuit (middle buck-boost circuit) is formed, comprising the HF filter capacitor $C_z$, the middle buck-boost inductor $L_z$, the buck-boost bridge leg 14, and the series connection of the output capacitors $C_{Pm}$, $C_{mN}$. This DC-DC buck-boost circuit may be seen as to be similar to a single-phase half-bridge voltage-source converter (VSC). The input voltage of this middle buck-boost circuit is the voltage $v_{Cz}$ (shown in FIG. 2C) across capacitor $C_Z$ and the output voltage of this middle buck-boost circuit is the output voltage $V_{DC}$ across the series connection of the output capacitors $C_{Pm}$, $C_{mN}$. The formed middle buck-boost circuit may be operated by PWM modulation of the switches $S_{Pz}$, $S_{zN}$ at a specified, possibly variable, switching frequency $f_s$ in order to control the current in the middle buck-boost inductor $L_z$.

Figure 2D:
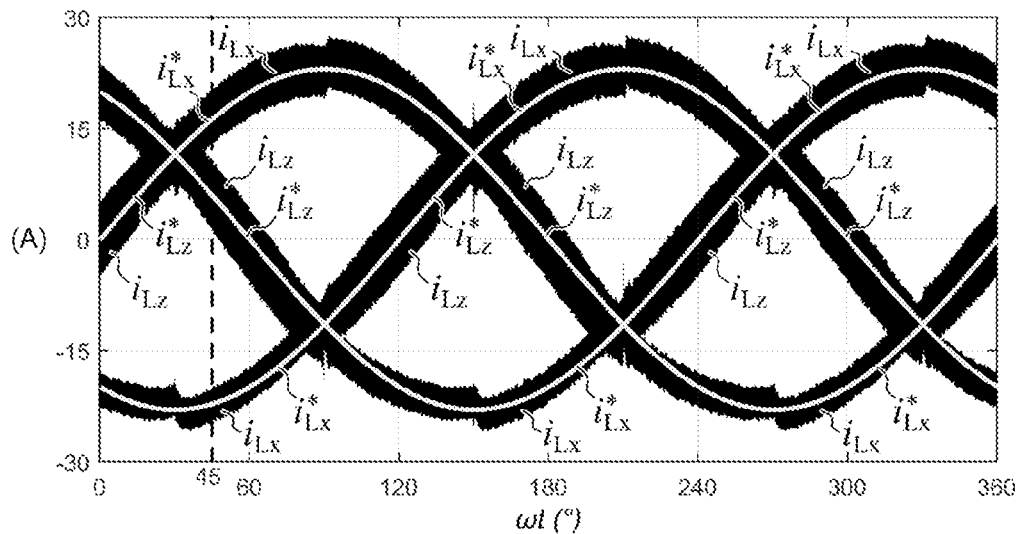
Figure 2E:
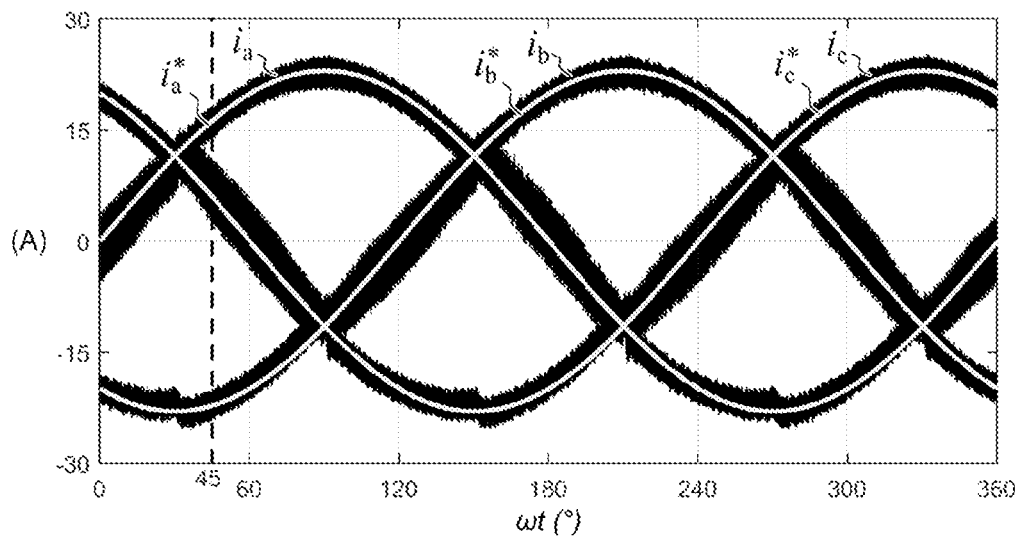
Figure 2F:
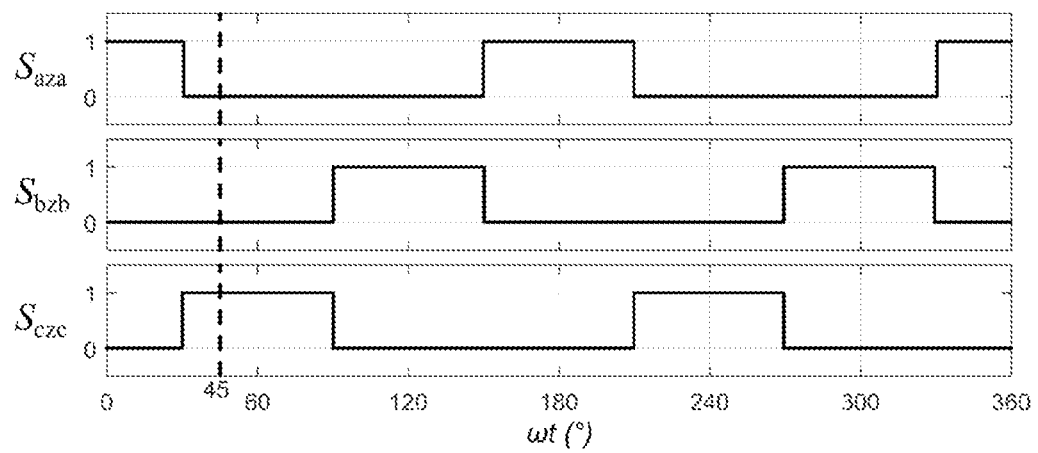
Figure 2G:
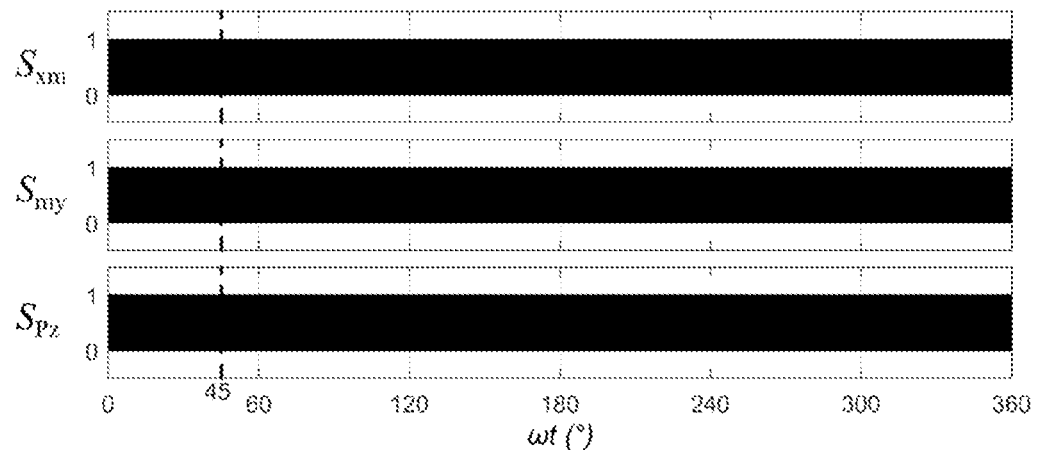

FIG. 2G shows the state of the switch $S_{xm}$ of the upper boost bridge leg 19, the state of the switch $S_{my}$ of the lower boost bridge leg 20, and the state of the switch $S_{Pz}$ (note that the state of the switch $S_{zN}$ is the complement of the state of the switch $S_{Pz}$) of the middle buck-boost bridge leg 14. The switches $S_{xm}$, $S_{my}$, $S_{Pz}$, $S_{zN}$ are all PWM modulated as can be seen from the black-colored bars, indicating PWM modulation of the corresponding switch.

An example of the currents $i_{Lx}$, $i_{Ly}$, $i_{Lz}$ in the inductors $L_x$, $L_y$, $L_z$ is shown in FIG. 2D. As can be seen, these currents are controlled to have piece-wise sinusoidal shapes and are transformed, i.e., as a result of the operation of the first converter stage 11, into three sinusoidal AC phase currents $i_a$, $i_b$, $i_c$ which are shown in FIG. 2E.

Figure 3:
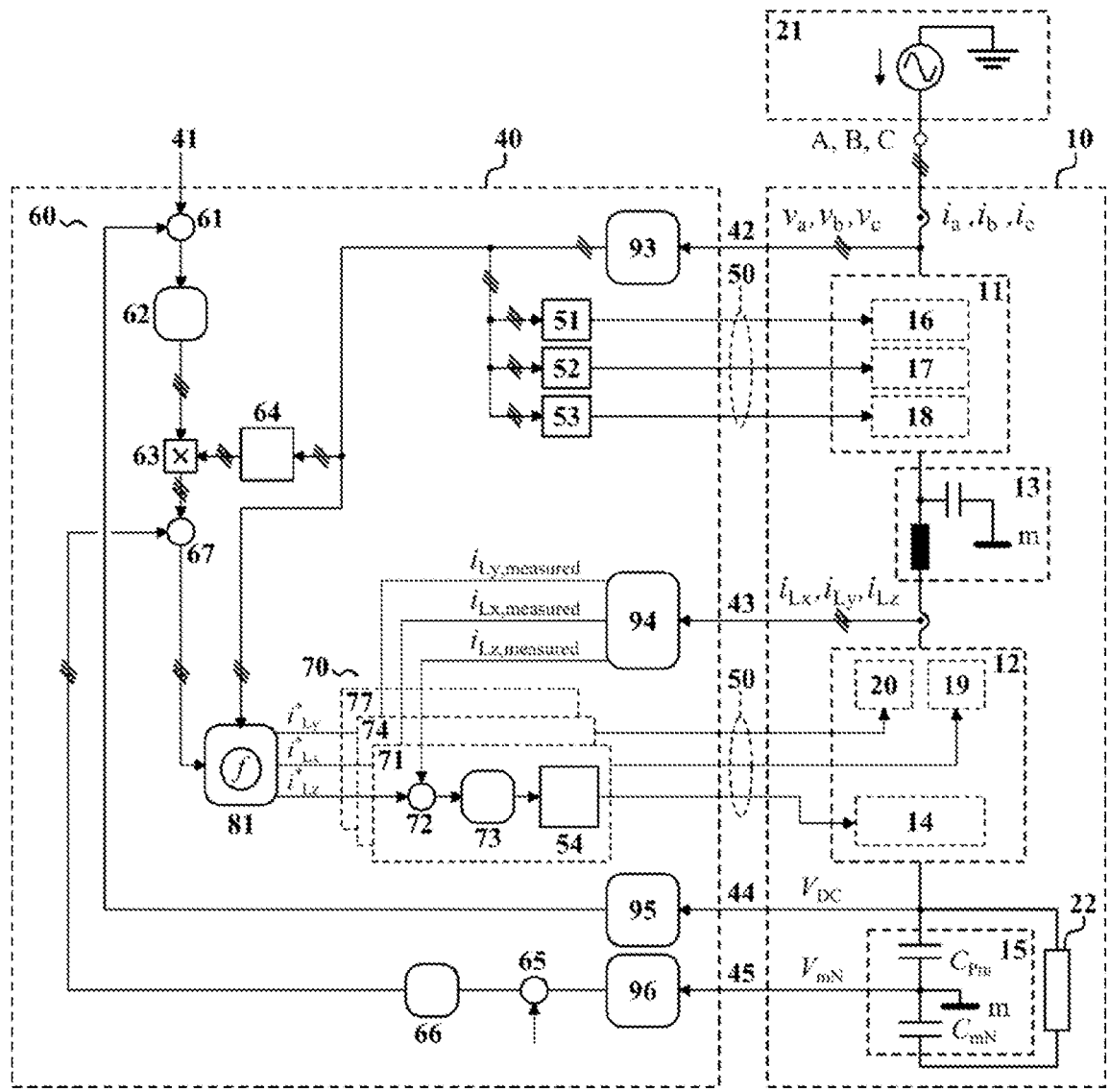
FIG. 3 shows a block diagram of an advantageous implementation of a central control unit and control method according to an embodiment of the present disclosure.

FIG. 3 shows a block diagram of an advantageous implementation of the central control unit 40 of FIG. 1 during the first mode of operation referred to as normal operation. The electrical converter 100 is represented in FIG. 3 as a 'single-wire' equivalent circuit, wherein the annotations of the elements correspond with those given in FIG. 1. Three slashes in a signal line indicate the bundling of three phase signals, and may represent the transition to a vector representation.

The goal of the control unit 40 is to control the output voltage $V_{PN}$ to a requested set-value $V^*_{PN}$ that is received from an external unit via input port 41, and to balance the voltage across the two output capacitors $C_{Pm}$ and $C_{mN}$, for example by controlling the voltage across the lower output capacitor $C_{mN}$ to be substantially equal to half the DC bus voltage. Additionally, the current drawn from the phase inputs (a, b, c) needs to be shaped substantially sinusoidal and controlled substantially in phase with the corresponding phase voltage. As explained previously, this can also be achieved by controlling the inductor currents $i_{Lx}$, $i_{Ly}$, $i_{Lz}$, i.e., instead of directly controlling the phase currents $i_a$, $i_b$, $i_c$, to have piece-wise sinusoidal shapes. In particular, the low-pass filtered values of the inductor currents are controlled while the high-frequency ripple of the inductor currents is filtered by the HF filter capacitors ($C_x$, $C_y$, $C_z$).

The control of the output voltage $V_{DC}$ is advantageously done using a cascaded control structure, comprising an outer voltage control loop 60 and inner current control loop 70. The set-value of the output voltage is input to a comparator 61 via input port 41, and is compared with the measured output voltage obtained from a measurement processing unit 95 (for example comprising a low-pass filter). The output of comparator 61 is the control-error signal of the output voltage, which is further input to a control element 62 (for example comprising a proportional-integral control block) that outputs the instantaneous set-values of the amplitudes of the phase currents. These amplitudes are input to multiplier 63, and multiplied with signals that are obtained from calculation element 64 that outputs normalized instantaneous values of the phase voltages. The input of calculation element 64 are the measured phase voltages obtained from a measurement processing unit 93 (for example comprising a low-pass filter). The output of the multiplier 63 are set-values $i^*_a$, $i^*_b$, $i^*_c$ for the instantaneous, for example low-pass filtered, phase currents $i_a$, $i_b$, $i_c$, and are shaped substantially sinusoidal and positioned substantially in phase with the corresponding phase voltages. The set-values $i^*_a$, $i^*_b$, $i^*_c$ are input to the current controller 70 after passing an addition element 67 and a selection element 81 whose functions are further detailed in the following text.

The current controller 70 is split into three individual current controllers 71, 74, 77, wherein:

individual current controller 71 is used for controlling the current in the middle buck-boost inductor $L_z$. This control is done by PWM modulation of the switches $S_{Pz}$, $S_{zN}$ of the middle buck-boost circuit containing middle buck-boost bridge leg 14. As a result of the operation of the first converter stage 11, therewith, controller 71 controls the current of the phase input A, B, C, that has a voltage between the highest voltage and the lowest voltage of the three-phase AC voltage;

individual current controller 74 is used for controlling the current in the upper boost inductor $L_x$. This control is done by PWM modulation of the switch $S_{xm}$ of the upper boost circuit containing upper boost bridge leg 19. As a result of the operation of the first converter stage 11, therewith, controller 74 controls the current of the phase input A, B, C, that has the highest voltage of the three-phase AC voltage;

individual current controller 77 is used for controlling the current in the lower boost inductor $L_y$. This control is done by PWM modulation of the switch $S_{my}$ of the lower boost circuit containing lower boost bridge leg 20. As a result of the operation of the first converter stage 11, therewith, controller 77 controls the current of the phase input A, B, C, that has the lowest voltage of the three-phase AC voltage.

Selector element 81 is used to send the set-values $i^*_a$, $i^*_b$, $i^*_c$ (shown in FIG. 2D) for the instantaneous phase currents to the correct individual current controller (71, 74, 77) depending on the voltage value of the phase inputs (A, B, C), resulting in inductor current set-values $i^*_{Lx}$, $i^*_{Ly}$, $i^*_{Lz}$ (shown in FIG. 2E) for each inductor current controller, wherein:

the set-value of the phase current of the phase input A, B, C, that has the highest voltage of the three-phase AC voltage is sent to individual current controller 74, resulting in set-value $i^*_{Lx}$;

the set-value of the phase current of the phase input A, B, C, that has the lowest voltage of the three-phase AC voltage is sent to individual current controller 77, resulting in set-value $i^*_{Ly}$;

the set-value of the phase current of the phase input A, B, C, that a voltage between the highest voltage and the lowest voltage of the three-phase AC voltage is sent to individual current controller 71, resulting in set-value $i^*_{Lz}$.

In each individual current controller the received set-value ($i^*_{Lx}$, $i^*_{Ly}$, $i^*_{Lz}$) for the instantaneous inductor current is input to a comparator, for example comparator 72 of individual current controller 71, and compared with the measured inductor current obtained from a measurement processing unit 94 (for example comprising a low-pass filter). The output of the comparator is the control-error signal of the current, which is further input to a control element, for example control element 73 of individual current controller 71, whose output is input to a PWM generation element, for example PWM generation element 54 of individual current controller 71. The PWM generation element of the individual current controllers generate the PWM-modulated control signals for the controllable semiconductor switches of the PWM-controlled bridge legs, i.e. the upper boost bridge leg 19 of the upper boost circuit, the lower boost bridge leg 20 of the lower boost circuit, and the middle buck-boost bridge leg 14 of the middle buck-boost circuit. These PWM-modulated control signals are sent to the appropriate bridge legs via communication interface 50.

The selector switches of the first converter stage 11 are either 'on' or 'off' during each 60° sector of the three-phase AC input voltage, depending on the voltage value of the phase inputs (A, B, C). The control signals for the selector switches are generated by switch-signal generators 51, 52, 53.

DC bus mid-point balancing can be done by adding an offset value to the set-values $i^*_a$, $i^*_b$, $i^*_c$ for the instantaneous, for example low-pass filtered, phase currents $i_a$, $i_b$, $i_c$, which are output by multiplier 63. The offset value is obtained by comparing the measured DC bus midpoint voltage obtained from a measurement processing unit 96 (for example comprising a low-pass filter) with a set-value (for example $V_{DC}/2$) using comparator 65 and feeding the error signal output by the comparator 65 into a control element 66.

The phase currents $i_a$, $i_b$, $i_c$ shown in FIG. 2E are obtained by controlling the electrical converter 100 using such control unit 40 and control method detailed in the foregoing text. Also shown in FIG. 2E are the set-values $i^*_a$, $i^*_b$, $i^*_c$ for the instantaneous, for example low-pass filtered, phase currents $i_a$, $i_b$, $i_c$, as input to selector element 81 shown in FIG. 3. As explained above, the phase currents $i_a$, $i_b$, $i_c$ are indirectly controlled, i.e., they are the result of the controlling of the inductor currents $i_{Lx}$, $i_{Ly}$, $i_{Lz}$ (shown in FIG. 2D) and the operation of the first converter stage 11. The set-points for the inductor currents ($i^*_{Lx}$, $i^*_{Ly}$, $i^*_{Lz}$) are derived from set-values $i^*_a$, $i^*_b$, $i^*_c$ by selector element 81 based on the measured phase voltages.

Figure 4A:
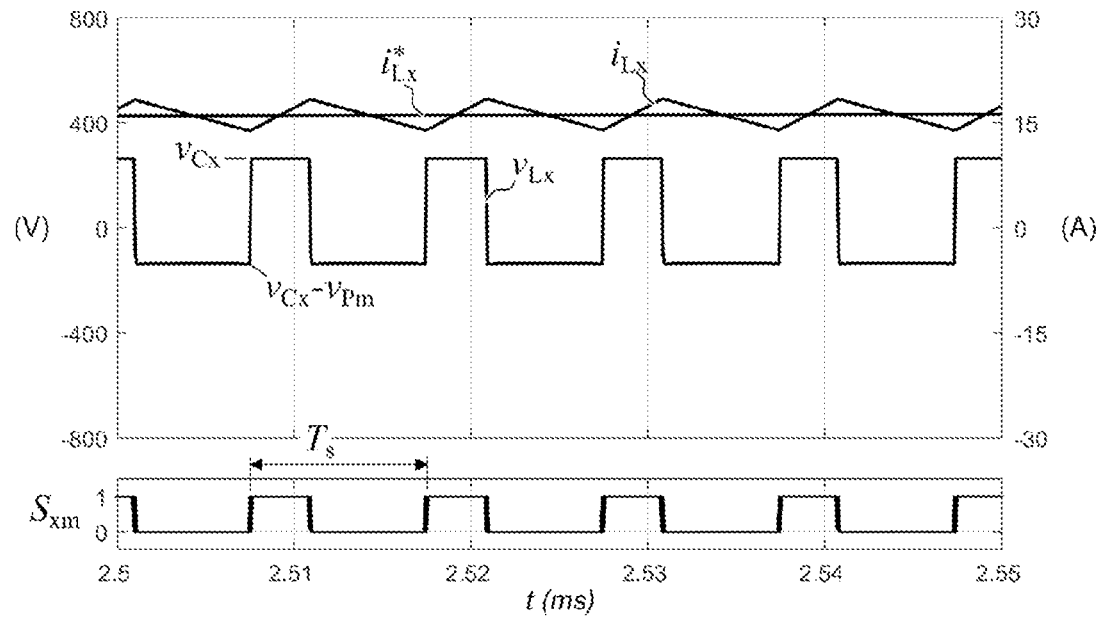
FIG. 4A, 4B, 4C show diagrams with voltages, currents and switching states within five consecutive switching cycles of the boost (upper and lower) and buck-boost bridge legs of the electrical converter, and illustrates the PWM modulation of these bridge legs according to an embodiment of the present disclosure.
Figure 4B:
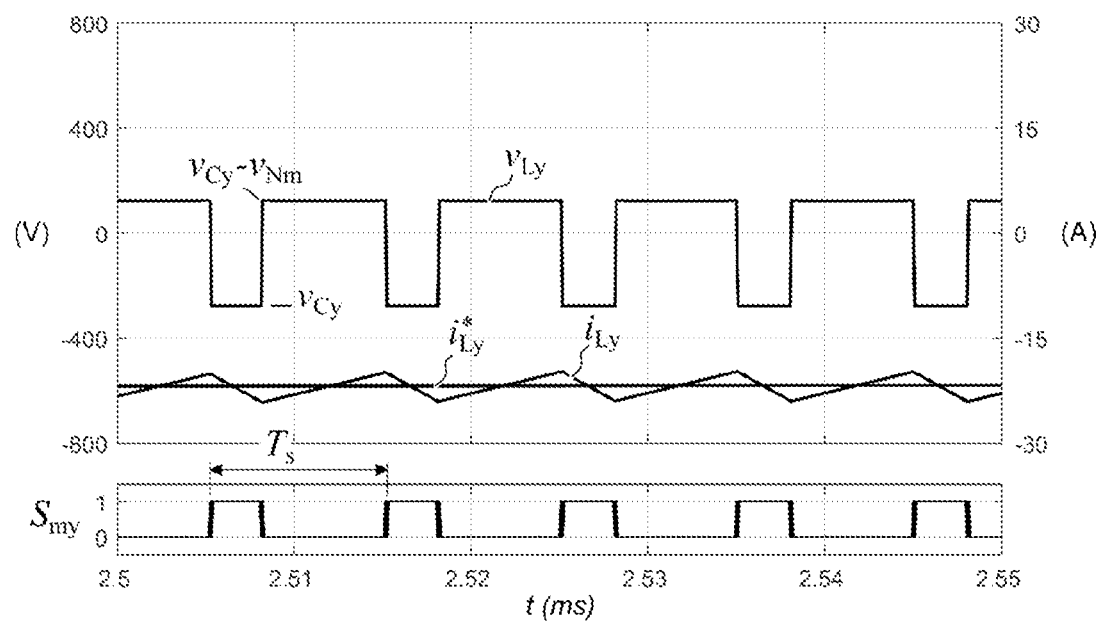
Figure 4C:
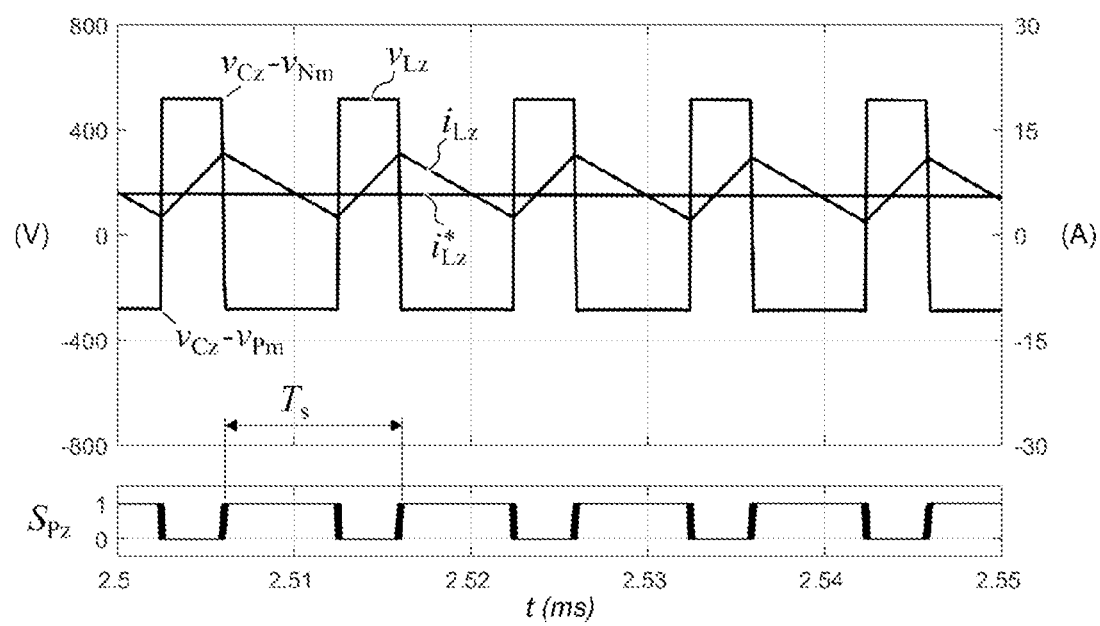

FIGS. 4A-4C show diagrams within five consecutive switching cycles (i.e., each having a switching period $T_s$ equal to $1/f_s$, with $f_s$ the switching frequency) of the bridge legs of the electrical converter 100, for a time interval around $\omega t=45°$ which lies within the sector of the three-phase AC input voltage where $0 \leq \omega t < 60°$ (see FIG. 2). Within this sector, the selector switches and diodes of the first converter stage 11 are in the following switching states:

Switch $S_{aza}=0$ (off), diode $D_{ax}=1$ (conducting), diode $D_{ya}=0$ (blocking); phase connection a is connected with node x;

Switch $S_{bzb}=0$ (off), diode $D_{bx}=0$ (blocking), diode $D_{yb}=1$ (conducting); phase connection b is connected with node y;

Switch $S_{czc}=1$ (on), diode $D_{cx}=0$ (blocking), diode $D_{yc}=0$ (blocking); phase connection c is connected with node z;

The diagrams of FIGS. 4A-4C show voltages, currents, and switching signals on a milliseconds time axis. FIG. 4A corresponds with the operation of the upper boost circuit, showing the corresponding inductor current $i_{Lx}$ (and the set-value $i^*_{Lx}$ of this current), the inductor voltage $v_{Lx}$, and the control signal $S_{xm}$ of the switch of the PWM-modulated upper boost bridge leg 19. FIG. 4B corresponds with the operation of the lower boost circuit, showing the corresponding inductor current $i_{Ly}$ (and the set-value $i^*_{Ly}$ of this current), the inductor voltage $v_{Ly}$, and the control signal $S_{my}$ of the switch of the PWM-modulated lower boost bridge leg 20. FIG. 4C corresponds with the operation of the middle buck-boost circuit, showing the corresponding inductor current $i_{Lz}$, (and the set-value $i^*_{Lz}$ of this current), the inductor voltage $v_{Lz}$, and the control signal $S_{Pz}$ of the upper switch of the PWM-modulated bridge leg 14. Note that the control signal $S_{zN}$ of the lower switch of the PWM-modulated bridge leg 14 is the complement of the control signal $S_{Pz}$.

In order to minimize the Total Harmonic Distortion (THD) of the AC input current of the electrical converter, the high-frequency ripple of phase currents $i_a$, $i_b$, $i_c$ advantageously minimized.

An advantage of the electrical converter 100 is that the half-switching-period volt-seconds product/area of the upper boost inductor and of the lower boost inductor are smaller than the volt-seconds products/areas of the boost inductors of a conventional six-switch boost-type PFC rectifier. This is because the voltages applied to these inductors are smaller than in the case of a conventional six-switch boost-type PFC rectifier. For the middle buck-boost inductor, the applied voltages are not necessarily smaller but the value of the current flowing in the inductor is smaller than the value of the currents flowing in inductors of a conventional six-switch boost-type PFC rectifier. As a result, smaller inductors with less magnetic energy storage are feasible, resulting in a higher power-to-volume ratio of the electrical three-phase AC-to-DC converter 100 that is provided by the present disclosure.

For converters 200 provided with a switching device 23, at start-up, switching device 23 is opened to interrupt conduction between the upper nodes of the bridge rectifier 24 and the upper intermediate node x. No current flows through inductor $L_x$. The phase selector 25 is now operated to apply at the middle intermediate node z a phase input voltage which is slightly higher than the (instantaneous) output voltage VPN across the output terminals P, N for a limited amount of time (e.g. 1 us). By so doing, during the limited amount of time, the positive voltage difference between the voltage at the middle intermediate node z and the output voltage $V_{DC}$ is applied across the inductor $L_z$ causing a phase current to flow through inductor $L_z$ and further to the upper output terminal P due to the conduction of the (internal) anti-parallel diode $D_{zP}$ connected to switch $S_{Pz}$ between switch node t and terminal P. The current path hence goes from middle intermediate node z through switch node t through the anti-parallel diode $D_{zP}$ and through the capacitors $C_{Pm}$, $C_{mN}$ of the output filter 15 and back to lower intermediate node y and back to a phase of the grid through one of the lower corresponding diodes of the bridge rectifier 24. By so doing, the output voltage VPN can be stepped up gradually.

Democratic Control of the Electrical Converter

According to the present disclosure, the controller 40 is implemented with a second mode of operation, referred to as mode II, which is chosen when the requested and/or measured output voltage $V_{DC}$ is equal to or lower than the instantaneous full-wave rectified AC line voltage, i.e., $\max\{v_a, v_b, v_c\}-\min\{v_a, v_b, v_c\}$. In the second mode of operation, the upper and lower boost bridge legs 19, 20 are not operated, and switches $S_{xm}$, $S_{my}$ are open (not conducting). The diodes $D_{xP}$, $D_{Ny}$ in this case are conducting and connect the intermediate nodes r, s to the output terminals P, N. Where diodes $D_{xP}$, $D_{Ny}$ are replaced by active switches $S_{Px}$, $S_{yN}$, such as in converter 200 of FIG. 5, needless to say, these are advantageously set to closed/conductive state to improve efficiency.

In the second mode of operation, the first converter stage 11 and the current injection circuit 14 operates just like during normal operation.

Figure 10A:
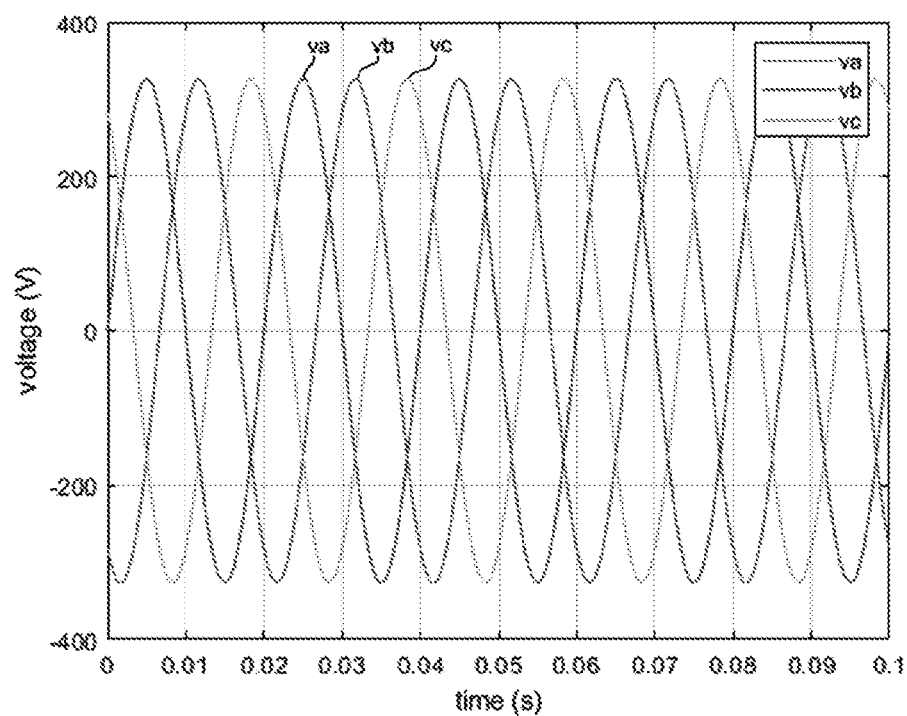
FIG. 10A represents the three-phase mains voltages $v_a$, $v_b$, and $v_c$.
Figure 10B:
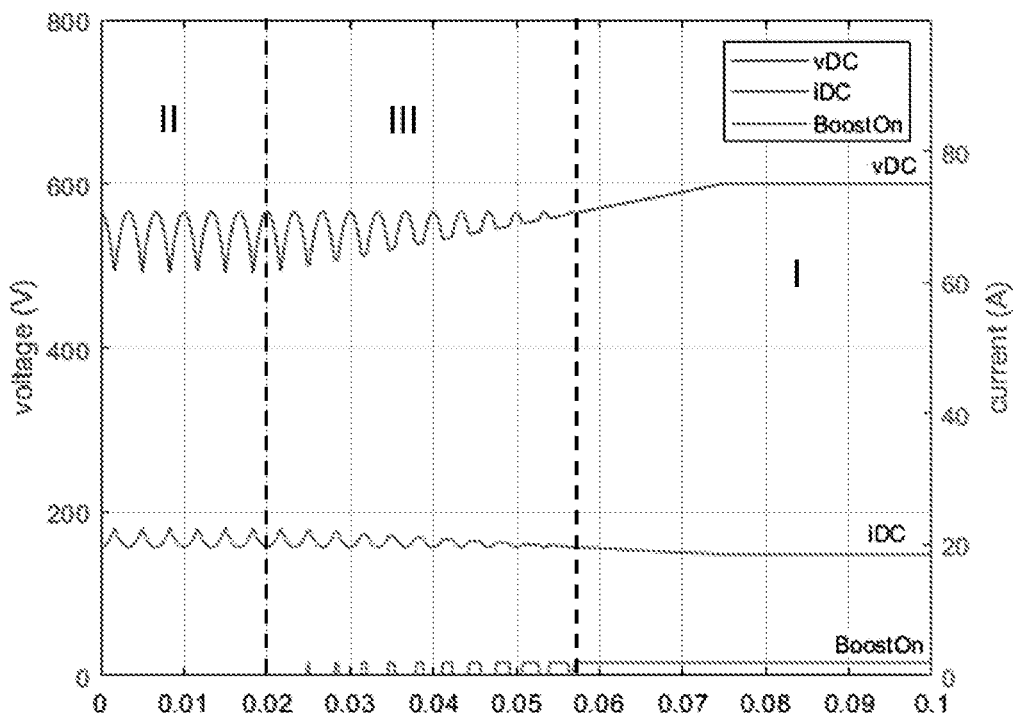
FIG. 10B represents the output voltage $V_{DC}$ across the output terminals P, N and the corresponding output current $i_{DC}$ along with the BoostOn signal for controlling whether the boost circuit 19, 20 are operated or not.

By so doing, a reduced voltage is obtained at the output terminals P, N as shown in section II of FIG. 10B, which in steady state equals a rectified mains voltage. Section I refers to normal operation, referred to as mode I operation, in which the upper and lower boost bridge legs are operated to provide a higher output voltage, and the electrical converter 100 hence operates as a normal boost converter.

Section III of FIG. 10B refers to a transition mode that is advantageously applied to transition between operating modes I and II, and/or to obtain an average output voltage intermediate between the average output voltages of mode I and mode II.

The transition mode is obtained by operating the upper and lower boost bridge legs (switches $S_{xm}$, $S_{my}$) only during time portions in which the requested and/or measured output voltage $V_{DC}$ is higher than the instantaneous full-wave rectified AC line voltage, as shown by the 'BoostOn' signal in FIG. 10B, in which a high value indicates the boost bridge legs 19, 20 are operated and a low value indicates that circuits 19, 20 are not operated.

Figure 11:
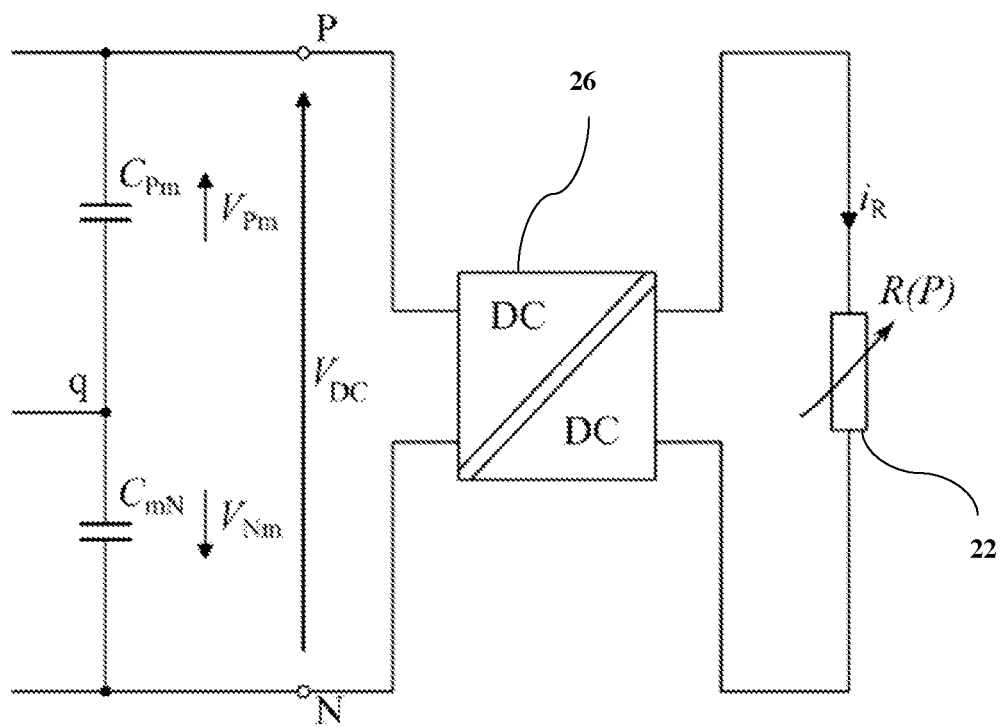
FIG. 11 represents the DC terminals of the electrical converter according to the present disclosure, to which an isolated DC/DC converter stage is connected.

It will be convenient to note that in mode II operation, a pulsating output voltage is obtained, e.g. 150 Hz pulsation for 50 Hz mains frequency, but this can easily be absorbed by an additional DC/DC converter stage which is connected to the output terminals P, N, in particular a galvanically isolated DC/DC converter stage 26 as shown in FIG. 11, which typically is provided in (vehicle) battery charging systems. Converter stage 26 is series connected between the DC terminals P, N and the load 22. An important advantage of the mode II operation is that the (isolated) DC/DC converter stage 26 can operate with a reduced voltage ratio when a low output voltage is requested (e.g. when the battery is empty). This reduces stress on the (isolated) DC/DC converter stage and allows to make it smaller and more efficient.

Advantageously, the additional DC/DC converter stage 26 is operated in constant power mode during mode II operation, and possibly mode I operation and/or transition mode III. When converter stage 26 is operated in constant power mode, due to the relation between power P, current I and voltage v: i*v=P, the current $i_{DC}$ obtained at the DC terminals P, N is shown in FIG. 10B, i.e; $i_{DC}*V_{DC}$=constant. In constant power mode operation of DC/DC converter stage 26, sinusoidal currents can be obtained at the AC mains side 21, allowing to obtain unity power factor. In this case, during mode II operation, the current injection circuit 14 is advantageously operated.

During mode II operation, the switching device 23 (see FIG. 5), if present, is kept closed (conducting state) to apply the phase input having highest voltage by the bridge rectifier 24 to the upper intermediate node x.

Figure 12:
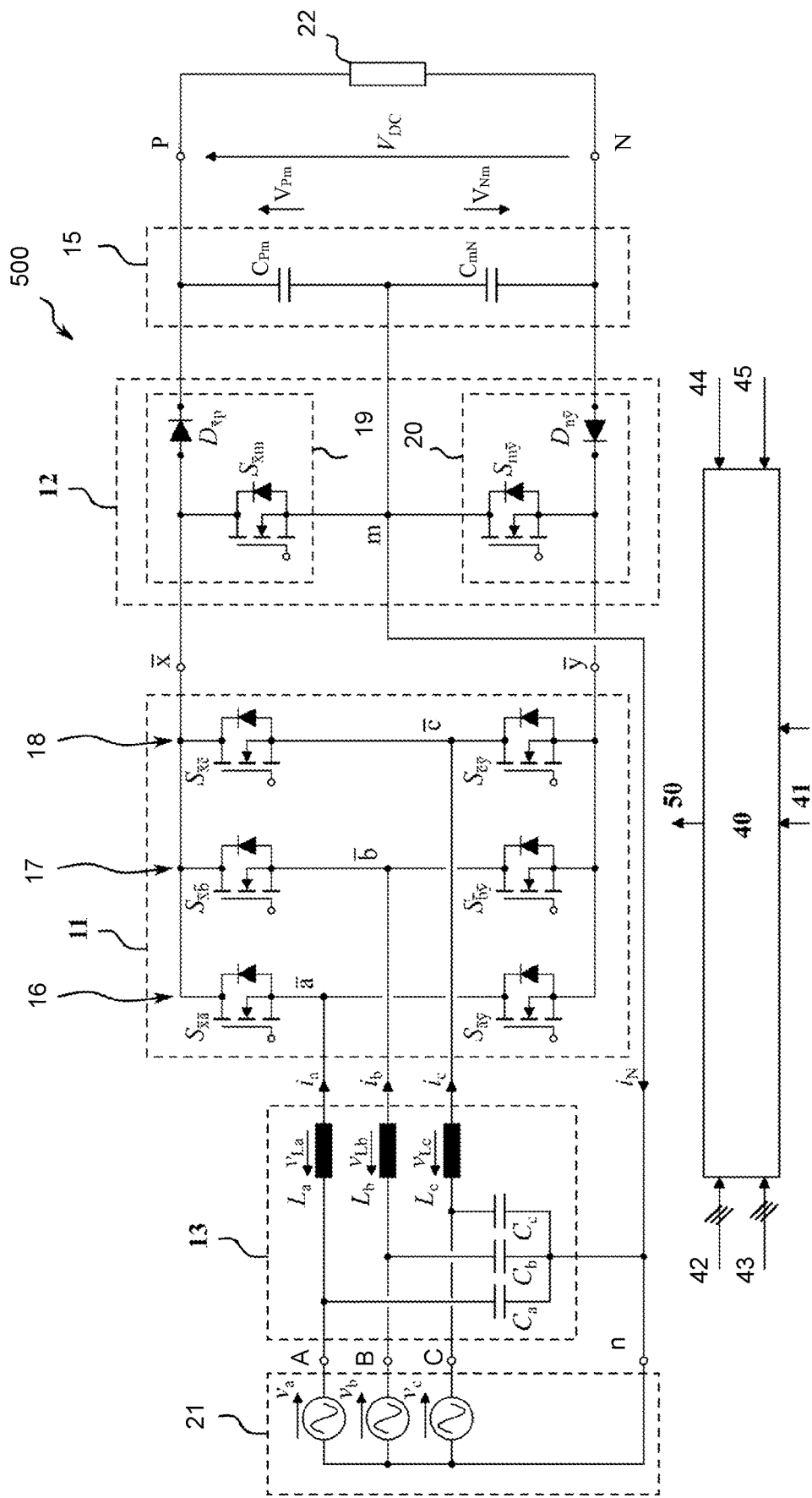
FIG. 12 represents a topology of an electrical converter according to another embodiment of the present disclosure.
Figure 13A:
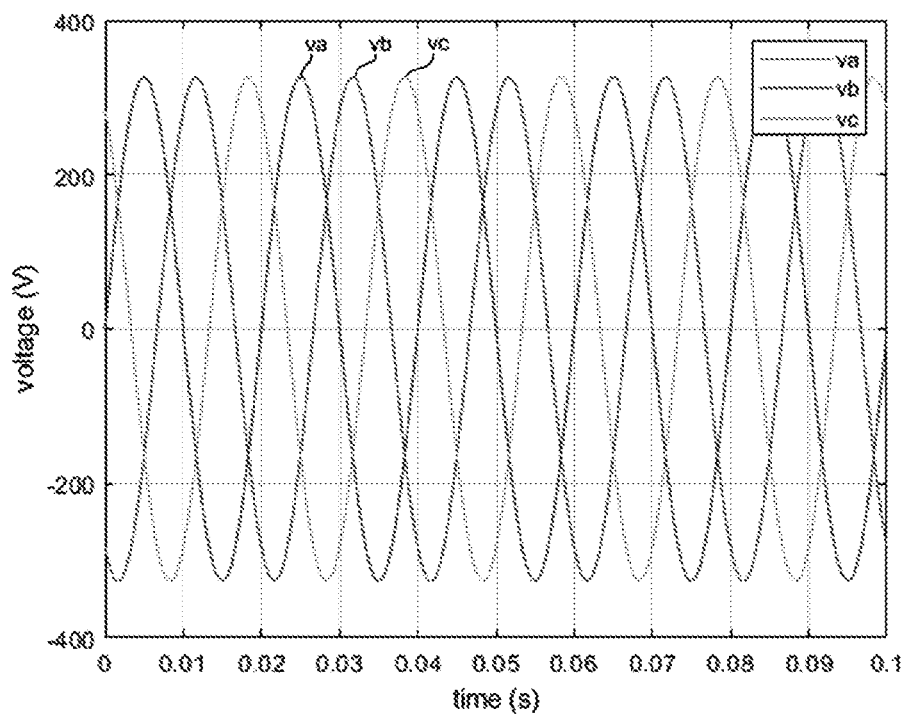
FIG. 13A represents the three-phase mains voltages $v_a$, $v_b$, and $v_c$.
Figure 13B:
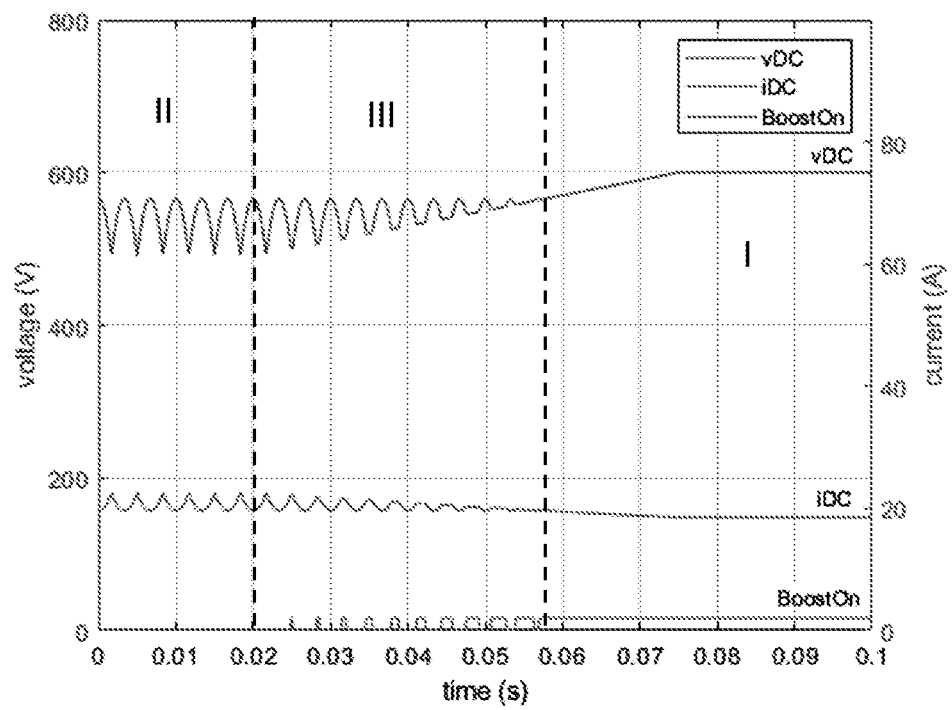
FIG. 13B represents the output voltage $V_{DC}$ (also referred to as $V_{PN}$) across the output terminals P, N and the corresponding output current IDC along with the BoostOn signal for controlling whether the boost circuit 19, 20 are operated or not.

Yet another exemplary embodiment of electrical converter 500 is represented in FIG. 12. Electrical converter 500 differs from converters 100, 200, 300 and 400 in that the phase selector 25 and the current injection circuit 14 are missing. Instead, third harmonic current injection is provided directly through the switches of the bridge legs 16, 17, 18. These are provided as active bridge legs allowing for bidirectional operation.

Alternative Converter Topology

Electrical converter 500, referred to as the BELGIAN RECTIFIER, comprises a first converter stage in the form of a three-phase active rectifier stage 11 and a DC/DC stage 12. Electrical converter 500 further comprises an input filter 13, and an output filter 14.

The electrical converter 500 is an AC-to-DC converter that has three phase inputs a, b, c which are connected to a three-phase voltage of a three-phase AC grid 21, two DC outputs P, N which for example may be connected to a DC load 22 such as, for example, a high voltage (e.g. 800 V) battery of an electric car, and a terminal n for connecting the neutral conductor of the AC grid 21.

The two converter stages 11, 12 may be seen as one 'integrated' conversion stage since no high-frequency filter capacitors are present between the two power stages and since both stages use common energy storage inductors (boost inductors). In particular, the phase inductors $L_a$, $L_b$, $L_c$, of the input filter 13 are used as boost inductors and are shared between both converter stages 11, 12.

The rectifier stage 11 has three phase inputs $\bar{a}$, $\bar{b}$, $\bar{c}$ that are connected to the three phase inputs A, B, C via the phase inductors $L_a$, $L_b$, $L_c$, of the input filter 13, and two outputs $\bar{x}$, $\bar{y}$. These outputs may be seen as an upper intermediate voltage node $\bar{x}$, and a lower intermediate voltage node $\bar{y}$, which show a 'switched' voltage potential caused by the switching of the DC/DC stage 12.

The rectifier stage 11 consists of three bridge legs 16, 17, 18 which each comprise two actively switchable semiconductor devices ($S_{\bar{x}\bar{a}}$ and $S_{\bar{a}\bar{y}}$ for leg 16, $S_{\bar{x}\bar{b}}$ and $S_{\bar{b}\bar{y}}$ for leg 17, $S_{\bar{x}\bar{c}}$ and $S_{\bar{c}\bar{y}}$ for leg 18) connected in the form of a half bridge configuration. Each switchable semiconductor device has an anti-parallel diode. In this example, Metal Oxide Field Effect Transistors (MOSFETs) are used for the actively switchable semiconductor devices, which each contain an internal anti-parallel body diode that may replace an external anti-parallel diode.

The output power stage consists of two stacked boost bridges 19, 20. Each boost bridge comprises a boost switch ($S_{\bar{x}m}$ for the upper boost bridge 19 and $S_{m\bar{y}}$ for the lower boost bridge 20) and boost diode ($D_{\bar{x}p}$ for the upper boost bridge 19 and $D_{n\bar{y}}$ for the lower boost bridge 20) connected in a half-bridge configuration. The middle node of the upper boost bridge 19 is connected to intermediate voltage node $\bar{x}$ and the middle node of the lower boost bridge 20 is connected to intermediate voltage node $\bar{y}$. The common node m of both boost stages is connected to the midpoint of the output filter 15 which comprises two output filter capacitors $C_{Pm}$, $C_{mN}$ that are connected in series between the upper output node p and the lower output node n.

The upper boost bridge 19 is connected between the upper output node p and the middle output node m (i.e. in parallel with the upper output filter capacitor $C_{Pm}$), and is arranged in a way that the intermediate voltage node $\bar{x}$ can be alternately connected to the middle output node m and the upper output node P by controlling switch $S_{\bar{x}m}$, wherein current can flow from the intermediate voltage node $\bar{x}$ to the upper output node P via the diode $D_{\bar{x}p}$ when the switch $S_{\bar{x}m}$ is opened (not conducting), and current can flow from the intermediate voltage node $\bar{x}$ to the middle output node m (or vice versa) via the switch $S_{\bar{x}m}$ when the switch $S_{\bar{x}m}$ is closed (conducting).

The lower boost bridge 20 is connected between the middle output node m and the lower output node N (i.e. in parallel with the lower output filter capacitor $C_{mN}$), and is arranged in a way that the intermediate voltage node $\bar{y}$ can be alternately connected to the middle output node m and the lower output node N by controlling switch $S_{m\bar{y}}$, wherein current can flow from the lower output node N to the intermediate voltage node $\bar{y}$ via the diode $D_{n\bar{y}}$, when the switch $S_{m\bar{y}}$ is opened (not conducting), and current can flow from the middle output node m to the intermediate voltage node y (or vice versa) via the switch $S_{m\bar{y}}$ when the switch $S_{m\bar{y}}$ is closed (conducting).

The boost switches ($S_{\bar{x}m}$, $S_{m\bar{y}}$) of the boost bridges are actively switchable semiconductor devices. In the example of FIG. 12, MOSFETs are used.

Three AC capacitors $C_a$, $C_b$, $C_c$, which are part of the input filter 13, are interconnecting the phase inputs a, b, c in the form of a star-connection. Generally, it is advantageous that the three capacitors $C_a$, $C_b$, $C_c$ have substantially equal value in order to symmetrically load the AC grid.

The neutral conductor of the three-phase AC grid, when available, can be connected to the neutral connection terminal n of the converter 500. This neutral connection terminal N is further connected to the star-point of the AC capacitors $C_a$, $C_b$, $C_c$ and to the common node m of the stacked boost bridges 19, 20 (and thus also to the midpoint of the output filter 15). This results in a fully symmetrical converter structure.

The bridge leg of the rectifier stage 11 that is connected with the phase input A, B, or C that has the highest voltage of the three-phase AC input voltage is switched in a way that the corresponding phase input A, B, or C is connected to the upper intermediate voltage node $\bar{x}$ via the corresponding phase inductor ($L_a$, $L_b$, or $L_c$). As a result, a conventional DC/DC boost converter (upper boost converter) is formed by the AC capacitor ($C_a$, $C_b$, or $C_c$) of the phase that has the highest voltage, the phase inductor ($L_a$, $L_b$, or $L_c$) of the phase that has the highest voltage, the upper boost bridge 19, and the upper output capacitor $C_{Pm}$. The input voltage of this upper boost converter is the voltage $v_a$, $v_b$, or $v_c$ of the phase input A, B, or C that has the highest voltage level, and the output voltage of this upper boost converter is the voltage $V_{Pm}$ across the upper output capacitor $C_{Pm}$, having a voltage value that is substantially equal to half the total DC bus voltage ($V_{Pm} \approx V_{DC}/2$). The formed upper boost converter might be operated by PWM modulation of the switch $S_{\bar{x}m}$ at a certain, possibly variable, switching frequency $f_s$ in order to control the current in the phase inductor ($L_a$, $L_b$, or $L_c$) of the phase that has the highest voltage.

The bridge leg of the rectifier stage 11 that is connected with the phase input A, B, or C that has the lowest voltage of the three-phase AC input voltage is switched in a way that the corresponding phase input A, B, or C is connected to the lower intermediate voltage node y via the corresponding phase inductor ($L_a$, $L_b$, or $L_c$). To achieve this, the bridge leg connects the corresponding phase input $\bar{a}$, $\bar{b}$, or $\bar{c}$ with the node $\bar{y}$. As a result, a conventional 'inversed' (negative input voltage and negative output voltage) DC/DC boost converter (lower boost converter) is formed by the AC capacitor ($C_a$, $C_b$, or $C_c$) of the phase that has the lowest voltage, the phase inductor ($L_a$, $L_b$, or $L_c$) of the phase that has the lowest voltage, the lower boost bridge 20, and the lower output capacitor $C_{mN}$. The input voltage of this lower boost converter is the voltage $v_a$, $v_b$, or $v_c$ of the phase input A, B or C that has the lowest voltage level, and the output voltage of this lower boost converter is the voltage $V_{Nm}$ across the lower output capacitor $C_{mN}$, having a voltage value that is substantially equal to minus half the total DC bus voltage ($V_{Nm} \approx -V_{DC}/2$). The formed lower boost converter might be operated by PWM modulation of the switch $S_{m\bar{y}}$ at a certain, possibly variable, switching frequency $f_s$ in order to control the current in the phase inductor ($L_a$, $L_b$, or $L_c$) of the phase that has the lowest voltage.

The bridge leg of the rectifier stage 11 that is connected with the phase input A, B or C that has a voltage between the highest voltage and the lowest voltage of the three-phase AC input voltage is switched in a way that the corresponding phase input A, B or C is alternately connected to the upper intermediate voltage node $\bar{x}$ and the lower intermediate voltage node $\bar{y}$ via the corresponding phase inductor ($L_a$, $L_b$, or $L_c$). To achieve this, the bridge leg alternately connects the corresponding phase input $\bar{a}$, $\bar{b}$, or $\bar{c}$ with the nodes $\bar{x}$ and $\bar{y}$. The bridge leg of the rectifier stage 11 connected with the phase input A, B or C that has a voltage between the highest voltage and the lowest voltage of the three-phase AC input voltage may be switched in a similar fashion as a single-phase half-bridge voltage-source converter (VSC), and is operated by PWM modulation of the switches of the bridge leg at a certain, possibly variable, switching frequency $f_s$ in order to control the current in the phase inductor ($L_a$, $L_b$, or $L_c$) of the phase that has a voltage between the highest voltage and the lowest voltage of the three-phase AC input voltage.

In summary is can be said that two out of three bridge legs of the rectifier stage 11 are in a 'selection state', selecting which AC capacitor ($C_a$, $C_b$, or $C_c$) and phase inductor ($L_a$, $L_b$, or $L_c$) are part of the upper boost converter that contains upper boost bridge 19 and upper output capacitor $C_{Pm}$, and that is used to control the current in the phase inductor ($L_a$, $L_b$, or $L_c$) of the phase input A, B or C that has the highest voltage of the three-phase AC input voltage, and which AC capacitor ($C_a$, $C_b$, or $C_c$) and phase inductor ($L_a$, $L_b$, or $L_c$) are part of the lower boost converter that contains lower boost bridge 20 and lower output capacitor $C_{mN}$, and that is used to control the current in the phase inductor ($L_a$, $L_b$, or $L_c$) of the phase input A, B or C that has the lowest voltage of the three-phase AC input voltage. The remaining bridge leg of the rectifier stage 11 is in an 'active switching state' and may be operated in a similar fashion as a single-phase half-bridge voltage-source converter (VSC). It forms a remaining switching circuit containing the remaining phase inductor ($L_a$, $L_b$, or $L_a$) and the remaining phase capacitor ($C_a$, $C_b$, or $C_c$) of the phase input a, b, or c that has a voltage between the highest voltage and the lowest voltage of the three-phase AC input voltage. The remaining switching circuit also contains the series connection of the two output capacitors $C_{Pm}$, $C_{mN}$, and is used to control the current in the phase inductor ($L_a$, $L_b$, or $L_a$) of the phase that has a voltage between the highest voltage and the lowest voltage of the three-phase AC input voltage.

The controller 40 is configured to operate the bridge leg to which the AC phase input having the smallest absolute instantaneous voltage (voltage between the highest voltage and the lowest voltage of the three-phase AC input voltage) is applied through pulse width modulation to connect this phase alternatingly to the upper and lower intermediate nodes x and y.

Similar to converter 100, the controller 40 of electrical converter 500 can be implemented with a mode II operation as described above. In mode II operation, the boost bridge legs 19, 20 are not operated and the first converter stage operates normally. Referring to FIG. 12B, mode II operation allows to obtain a reduced voltage similar to what can be obtained for converter 100. Alternative suitable converter topologies which can be implemented with operating modes as described herein are described in WO 2020/035527.

Figure 14:
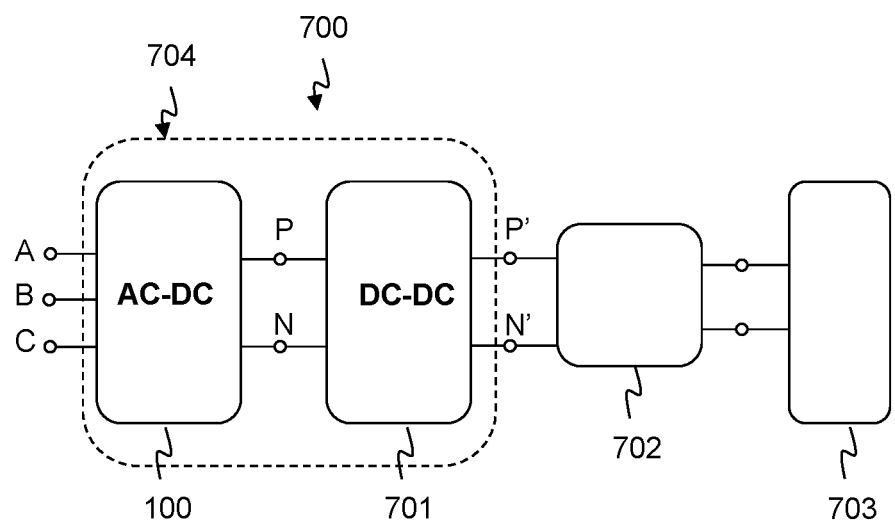
FIG. 14 represents a battery charging system according to aspects of the present disclosure.

Referring to FIG. 14, a battery charging system 700 comprises a power supply unit 704. The power supply unit 704 is coupled on one side to the AC grid through terminals A, B, C, and on the other side (at terminals P', N') to an interface 702, e.g. comprising a switch device, which allows to connect the power supply unit 704 to a battery 703. The power supply unit 704 comprises any one of the electrical converter 100 as described hereinabove with first and second converter stages and a third converter stage 701, which in the present system is a DC-DC converter. The power supply unit 704 can further comprise a pair of coils which are inductively coupled through air, such as in case of wireless power transfer (not shown). In some cases, the interface 702 can comprise a plug and socket, e.g. in wired power transfer. Alternatively, the plug and socket can be provided at the input (e.g., at nodes A, B, C).

The invention claimed is:

1. An electrical converter for converting an AC signal having three phase voltages to a DC signal, the electrical converter comprising:
   three phase terminals (A, B, C), a first DC terminal (P) and a second DC terminal (N);
   a first converter stage operably coupled to the three phase terminals and comprising a first intermediate node (x) and a second intermediate node (y), wherein the first converter stage is configured for converting between the AC signal at the three phase terminals and a first signal at the first intermediate node (x) and the second intermediate node (y);
   a second converter stage operably coupled to the first and second DC terminals (P, N) and comprising a third intermediate node (r) and a fourth intermediate node(s), wherein the second converter stage comprises a boost circuit operable to convert between a second signal at the third and fourth intermediate nodes (r, s) and the DC signal at the first and second DC terminals (P, N), wherein the boost circuit comprises at least one first active switch ($S_{xm}$, $S_{my}$);
   a link connecting the first intermediate node (x) to the third intermediate node (r) and the second intermediate node (y) to the fourth intermediate node(s),
   a current injection circuit operable to connect, through second active switches, between a phase terminal having a smallest absolute instantaneous voltage value of the three phase terminals and the first and second DC terminals (P, N), or between the phase terminal having the smallest absolute instantaneous voltage value and the first and second intermediate nodes;
   a controller implemented with a first mode of operation in which the at least one first active switch ($S_{xm}$, $S_{my}$) and the second active switches are operated through a pulse width modulation;

wherein the electrical converter further comprises a third converter stage operably coupled to the first and second DC terminals (P, N) and operable to convert the DC signal at the first and second DC terminals to a fourth signal at at least two third terminals (P', N');
wherein the controller is implemented with a second mode of operation in which the third and fourth intermediate nodes (r, s) are continuously connected to the first and second DC terminals (P, N) respectively such that the second converter stage is inoperative, the second active switches are operated through the pulse width modulation, and the third converter stage is configured to be operated in a constant power mode; and
wherein the controller comprises a first input configured to receive a third signal representative of a set or measured voltage at the first and second DC terminals, wherein the controller is configured to determine a threshold representative of an instantaneous full-wave rectified voltage value of the AC signal and to operate in the second mode of operation based on comparison between the third signal and the threshold.

2. The electrical converter of claim 1, wherein the controller is configured to operate in the second mode of operation when the third signal is equal to or lower than the threshold.

3. The electrical converter of claim 1, wherein the controller is configured to transition between the first and second modes of operation by intermittent operation of the boost circuit.

4. The electrical converter of claim 1, wherein the third converter stage comprises at least one DC/DC converter or a DC/AC converter.

5. The electrical converter of claim 4, wherein the third converter stage comprises a galvanically isolated DC/DC converter.

6. The electrical converter of claim 1, wherein the boost circuit comprises a first boost circuit and a second boost circuit stacked between the first DC terminal (P) and the second DC terminal (N), wherein the first and second boost circuits comprise a common node (m), each of the first and second boost circuits comprising at least one of the first active switch ($S_{xm}$, $S_{my}$).

7. The electrical converter of claim 1, wherein the current injection circuit comprises a phase selector comprising third active switches ($S_{aza}$, $S_{bzb}$, $S_{czc}$) configured to selectively connect the three phase terminals to a fifth intermediate node (z), wherein the second active switches ($S_{Pz}$, $S_{zN}$) are operable to connect the fifth intermediate node (z) to the first DC terminal (P) and to the second DC terminal (N), wherein the controller is configured to control switching of the third active switches according to a switching pattern in which the phase terminal having the smallest absolute instantaneous voltage value of the three phase voltages is continuously connected to the fifth intermediate node (z).

8. The electrical converter of claim 7, wherein in the second mode of operation, the controller is configured to operate the second active switches ($S_{Pz}$, $S_{zN}$) by the pulse width modulation.

9. The electrical converter of claim 1, wherein the first converter stage comprises a bridge converter comprising three active bridge legs for converting between the AC signal at the three phase terminals and the first signal at the first intermediate node (x) and the second intermediate node (y), and wherein the controller is configured to operate an active bridge leg of the three active bridge legs corresponding to the phase voltage of the AC signal having the smallest absolute instantaneous voltage value through the pulse width modulation to act as the second active switches of the current injection circuit.

10. The electrical converter of claim 9, wherein the bridge converter is configured to continuously connect the phase terminal corresponding to the phase of the AC signal having a highest instantaneous voltage value to the first intermediate node, and the phase terminal corresponding to the phase of the AC signal having a lowest instantaneous voltage value to the second intermediate node.

11. A battery charging system comprising a power supply, the power supply comprising the electrical converter of claim 1.

12. An electric motor drive system, comprising a power supply, the power supply comprising the electrical converter of claim 1.

13. The electrical converter of claim 9, wherein the first signal is the second signal.

14. An electrical converter for converting an AC signal having three phase voltages to a DC signal, the electrical converter comprising:
three phase terminals (A, B, C), a first DC terminal (P) and a second DC terminal (N);
a first converter stage operably coupled to the three phase terminals and comprising a first intermediate node (x) and a second intermediate node (y), wherein the first converter stage is configured for converting between the AC signal at the three phase terminals and a first signal at the first intermediate node (x) and the second intermediate node (y);
a second converter stage operably coupled to the first and second DC terminals (P, N) and comprising a third intermediate node (r) and a fourth intermediate node(s), wherein the second converter stage comprises a boost circuit operable to convert between a second signal at the third and fourth intermediate nodes (r, s) and the DC signal at the first and second DC terminals (P, N), wherein the boost circuit comprises at least one first active switch ($S_{xm}$, $S_{my}$);
a link connecting the first intermediate node (x) to the third intermediate node (r) and the second intermediate node (y) to the fourth intermediate node(s),
a current injection circuit operable to connect, through second active switches, between a phase terminal having a smallest absolute instantaneous voltage value of the three phase terminals and the first and second DC terminals (P, N), or between the phase terminal having the smallest absolute instantaneous voltage value and the first and second intermediate nodes;
a controller implemented with a first mode of operation in which the at least one first active switch ($S_{xm}$, $S_{my}$) and the second active switches are operated through a pulse width modulation;
wherein the electrical converter further comprises a third converter stage operably coupled to the first and second DC terminals (P, N) and operable to convert the DC signal at the first and second DC terminals to a fourth signal at at least two third terminals (P', N');
wherein the controller is implemented with a second mode of operation in which the third and fourth intermediate nodes (r, s) are continuously connected to the first and second DC terminals (P, N) respectively such that the second converter stage is inoperative, the second active switches are operated through the pulse width modulation, and the third converter stage is configured to be operated in a constant power mode; and wherein the current injection circuit comprises a phase selector comprising third active switches ($S_{aza}$, $S_{bzb}$, $S_{czc}$) configured to selectively connect the three phase terminals to a fifth intermediate node (z), wherein the second active switches ($S_{Pz}$, $S_{zN}$) are operable to connect the fifth intermediate node (z) to the first DC terminal (P) and to the second DC terminal (N), wherein the controller is configured to control switching of the third active switches according to a switching pattern in which the phase terminal having the smallest absolute instantaneous voltage value of the three phase voltages is continuously connected to the fifth intermediate node (z).

15. A battery charging system comprising a power supply, the power supply comprising the electrical converter of claim 14.

16. An electric motor drive system comprising a power supply, the power supply comprising the electrical converter of claim 14.

17. An electrical converter for converting an AC signal having three phase voltages to a DC signal, the electrical converter comprising:
three phase terminals (A, B, C), a first DC terminal (P) and a second DC terminal (N);
a first converter stage operably coupled to the three phase terminals and comprising a first intermediate node (x) and a second intermediate node (y), wherein the first converter stage is configured for converting between the AC signal at the three phase terminals and a first signal at the first intermediate node (x) and the second intermediate node (y);
a second converter stage operably coupled to the first and second DC terminals (P, N) and comprising a third intermediate node (r) and a fourth intermediate node(s), wherein the second converter stage comprises a boost circuit operable to convert between a second signal at the third and fourth intermediate nodes (r, s) and the DC signal at the first and second DC terminals (P, N), wherein the boost circuit comprises at least one first active switch ($S_{xm}$, $S_{my}$);
a link connecting the first intermediate node (x) to the third intermediate node (r) and the second intermediate node (y) to the fourth intermediate node(s), a current injection circuit operable to connect, through second active switches, between a phase terminal having a smallest absolute instantaneous voltage value of the three phase terminals and the first and second DC terminals (P, N), or between the phase terminal having the smallest absolute instantaneous voltage value and the first and second intermediate nodes;
a controller implemented with a first mode of operation in which the at least one first active switch ($S_{xm}$, $S_{my}$) and the second active switches are operated through a pulse width modulation;
wherein the electrical converter further comprises a third converter stage operably coupled to the first and second DC terminals (P, N) and operable to convert the DC signal at the first and second DC terminals to a fourth signal at at least two third terminals (P', N');
wherein the controller is implemented with a second mode of operation in which the third and fourth intermediate nodes (r, s) are continuously connected to the first and second DC terminals (P, N) respectively such that the second converter stage is inoperative, the second active switches are operated through the pulse width modulation, and the third converter stage is configured to be operated in a constant power mode; and wherein the first converter stage comprises a bridge converter comprising three active bridge legs for converting between the AC signal at the three phase terminals and the first signal at the first intermediate node (x) and the second intermediate node (y), and wherein the controller is configured to operate an active bridge leg of the three active bridge legs corresponding to the phase voltage of the AC signal having the smallest absolute instantaneous voltage value through the pulse width modulation to act as the second active switches of the current injection circuit.

18. A battery charging system comprising a power supply, the power supply comprising the electrical converter of claim 17.

19. An electric motor drive system comprising a power supply, the power supply comprising the electrical converter of claim 17.

* * * * *